United States Patent
Ye et al.

(10) Patent No.: US 9,760,186 B2
(45) Date of Patent: Sep. 12, 2017

(54) ELECTRONIC DEVICE FOR USE IN MOTION DETECTION AND METHOD FOR OBTAINING RESULTANT DEVIATION THEREOF

(75) Inventors: Zhou Ye, Foster City, CA (US);
Chin-Lung Li, Taoyuan County (TW);
Shun-Nan Liou, Kaohsiung (TW)

(73) Assignee: CM HK LIMITED, Fortress Hill (HK)

( * ) Notice: Subject to any disclaimer, the term of this patent is extended or adjusted under 35 U.S.C. 154(b) by 175 days.

(21) Appl. No.: 13/072,794

(22) Filed: Mar. 28, 2011

(65) Prior Publication Data

US 2011/0175806 A1 Jul. 21, 2011

Related U.S. Application Data

(63) Continuation-in-part of application No. 12/943,934, filed on Nov. 11, 2010.

(60) Provisional application No. 61/292,558, filed on Jan. 6, 2010.

(51) Int. Cl.
G06F 3/0346 (2013.01)
G01C 21/16 (2006.01)
G06F 3/038 (2013.01)

(52) U.S. Cl.
CPC ......... *G06F 3/0346* (2013.01); *G01C 21/165* (2013.01); *G06F 3/0383* (2013.01)

(58) Field of Classification Search
CPC ....... G06F 1/1694; G06F 3/017; G06F 3/0346
USPC ........................................................ 345/156
See application file for complete search history.

(56) References Cited

U.S. PATENT DOCUMENTS

| 5,138,154 A | 8/1992 | Hotelling |
| 5,440,326 A | 8/1995 | Quinn |
| 5,898,421 A | 4/1999 | Quinn |
| 6,957,156 B2 * | 10/2005 | Jo .......................... G01C 17/38 33/356 |

(Continued)

OTHER PUBLICATIONS

Azuma, Ronald et al. Improving Static and Dynamic Registration in an Optical See-Through HMD. Proceedings of SIGGRAPH '94 (Orlando, Fla., Jul. 24-29, 1994), Computer Graphics, Annual Conference Series, 1994, 197 204.*

*Primary Examiner* — Bryan Earles
(74) *Attorney, Agent, or Firm* — McClure, Qualey & Rodack, LLP

(57) ABSTRACT

An electronic device utilizing a nine-axis motion sensor module, capable of accurately outputting a resultant deviation including deviation angles in a 3D reference frame is provided. The present invention provides a novel comparison and compensation to accurately obtain a resultant deviation including deviation angles of the electronic device under the presence of external and/or internal interferences including the ones caused by undesirable electromagnetic fields and the ones associated with undesirable external forces and axial accelerations. The output of the nine-axis motion sensor module of the present invention including a rotation sensor, an accelerometer and a magnetometer can be advantageously obtained and compensated with a comparison comparing different states of the motion sensor module such that an updated state associated with the output and the resultant deviation angles of the nine-axis motion sensor module are preferably obtained in an absolute manner with the undesirable external interferences being effectively excluded.

22 Claims, 10 Drawing Sheets

(56) References Cited

U.S. PATENT DOCUMENTS

| | | |
|---|---|---|
| 7,158,118 B2 | 1/2007 | Liberty |
| 7,236,156 B2 | 6/2007 | Liberty et al. |
| 7,239,301 B2 | 7/2007 | Liberty et al. |
| 7,262,760 B2 | 8/2007 | Liberty |
| 7,414,611 B2 | 8/2008 | Liberty |
| 7,489,298 B2 | 2/2009 | Liberty et al. |
| 7,535,456 B2 | 5/2009 | Liberty et al. |
| 2009/0115724 A1* | 5/2009 | Yamamoto ............ G06F 3/0346 345/158 |
| 2009/0182503 A1* | 7/2009 | Changey et al. ............. 701/221 |
| 2009/0262074 A1* | 10/2009 | Nasiri et al. ................. 345/158 |
| 2010/0161084 A1* | 6/2010 | Zhao et al. ..................... 700/85 |
| 2011/0199298 A1* | 8/2011 | Bassompiere ......... G01C 21/16 345/157 |

\* cited by examiner

ELECTRONIC DEVICE FOR USE IN MOTION DETECTION AND METHOD FOR OBTAINING RESULTANT DEVIATION THEREOF

CROSS-REFERENCE TO RELATED APPLICATION

This application is a continuation in part of and claims the priority benefit of U.S. application Ser. No. 12/943,934, filed on Nov. 11, 2010, now pending, which claims the priority benefit of U.S. application Ser. No. 61/292,558, filed on Jan. 6, 2010. The entirety of each of the above-mentioned patent applications is hereby incorporated by reference herein and made a part of this specification.

BACKGROUND OF THE INVENTION

Field of the Invention

The present invention generally relates to an electronic device, more particularly to an electronic device for use in computers, motion detection or navigation utilizing a motion sensor module and method of compensating signals of the motion sensor module subject to movements and rotations of said electronic device. The present invention utilizes a nine-axis motion sensor module with an enhanced comparison model to calculate and compensate accumulated errors associated with the motion sensor module and to obtain actual resulting deviation angles in spatial reference frame and under dynamic environments.

Description of the Related Art

FIG. 1 is a schematic diagram showing a user using a portable electronic device 110, such as a 3D pointing device or computer mouse, for detecting motions of the device and translating the detected motions to a cursor display such as a cursor pointing on the screen 122 of a 2D display device 120. If the pointing device 110 emits a light beam, the corresponding point would be the location where the light beam hits the screen 122. For example, the pointing device 110 may be a mouse of a computer or a pad of a video game console. The display device 120 may be a part of the computer or the video game console. There are two reference frames, such as the spatial pointer reference frame and the display frame, associated with the pointing device 110 and the display device 120, respectively. The first reference frame or spatial pointer reference frame associated with the pointing device 110 is defined by the coordinate axes $X_P$, $Y_P$ and $Z_P$ as shown in FIG. 1. The second reference frame or display frame associated with the display device 120 is defined by the coordinate axes $X_D$, $Y_D$ and $Z_D$ as shown in FIG. 1. The screen 122 of the display device 120 is a subset of the $X_D Y_D$ plane of the reference frame $X_D Y_D Z_D$ associated with the display device 120. Therefore, the $X_D Y_D$ plane is also known as the display plane associated with the display device 120.

A user may perform control actions and movements utilizing the pointing device for certain purposes including entertainment such as playing a video game, on the display device 120 through the aforementioned pointer on the screen 122. For proper interaction with the use of the pointing device, when the user moves the pointing device 110, the pointer on the screen 122 is expected to move along with the orientation, direction and distance travelled by the pointing device 110 and the display 120 shall display such movement of the pointer to a new location on the screen 122 of the display 120. The orientation of the pointing device 110 may be represented by three deviation angles of the 3D pointing device 110 with respect to the reference frame $X_P Y_P Z_P$, namely, the yaw angle 111, the pitch angle 112 and the roll angle 113. The yaw, pitch and roll angles 111, 112, 113 may be best understood in relation to the universal standard definition of spatial angles related to commercial vehicles or transportation such as ships and airplanes. Conventionally, the yaw angle 111 may represent the rotation of the pointing device 110 about the $Z_P$ axis; the pitch angle 112 may represent the rotation of the pointing device 110 about the $Y_P$ axis; the roll angle 113 may represent the rotation of the pointing device 110 about the $X_P$ axis.

In a known related art as shown in FIG. 1, when the yaw angle 111 of the pointing device 110 changes, the aforementioned pointer on the screen 122 must move horizontally or in a horizontal direction with reference to the ground in response to the change of the yaw angle 111. FIG. 2 shows what happens when the user rotates the pointing device 110 counterclockwise by a degree such as a 90-degree about the $X_P$ axis. In another known related art as shown in FIG. 2, when the yaw angle 111 changes, the aforementioned pointer on the screen 122 is expected to move vertically in response. The change of the yaw angle 111 can be detected by a gyro-sensor which detects the angular velocity $\omega_x$ of the pointing device 110 about the $X_P$ axis. FIG. 1 and FIG. 2 show that the same change of the yaw angle 111 may be mapped to different movements of the point on the screen 122. Therefore, a proper compensation mechanism for the orientation of the pointing device 110 is required such that corresponding mapping of the pointer on the screen 122 of the display 120 may be obtained correctly and desirably. The term compensation of the prior arts by Liberty (U.S. Pat. No. 7,158,118, U.S. Pat. No. 7,262,760 and U.S. Pat. No. 7,414,611) refers to the correction and compensation of signals subject to gravity effects or extra rotations about the axis related to "roll". The term of "comparison" of the present invention may generally refer to the calculating and obtaining of the actual deviation angles of the 3D pointing device 110 with respect to the first reference frame or spatial pointing frame $X_P Y_P Z_P$ utilizing signals generated by motion sensors while reducing or eliminating noises associated with said motion sensors; whereas the term mapping may refer to the calculating and translating of said deviation angles in the spatial pointing frame $X_P Y_P Z_P$ onto the aforementioned pointer on the display plane associated with the 2D display device 120 of a second reference frame or display frame $X_D Y_D Z_D$.

It is known that a pointing device utilizing 5-axis motion sensors, namely, Ax, Ay, Az, $\omega_Y$ and $\omega_Z$ may be compensated. For example, U.S. Pat. No. 7,158,118 by Liberty, U.S. Pat. No. 7,262,760 by Liberty and U.S. Pat. No. 7,414,611 by Liberty provide such pointing device having a 5-axis motion sensor and discloses a compensation using two gyro-sensors $\omega_Y$ and $\omega_Z$ to detect rotation about the $Y_p$ and $Z_p$ axes, and accelerometers Ax, Ay and Az to detect the acceleration of the pointing device along the three axes of the reference frame $X_P Y_P Z_P$. The pointing device by Liberty utilizing a 5-axis motion sensor may not output deviation angles of the pointing device in, for example, a 3D reference frame; in other words, due to due to the limitation of the 5-axis motion sensor of accelerometers and gyro-sensors utilized therein, the pointing device by Liberty cannot output deviation angles readily in 3D reference frame but rather a 2D reference frame only and the output of such device having 5-axis motion sensors is a planar pattern in 2D reference frame only. In addition, it has been found that the pointing device and compensation disclosed therein cannot accurately or properly calculate or obtain movements, angles and directions of the pointing device while being subject to undesirable interferences, external or internal, in the dynamic environment during the obtaining of the signals generated by the motion sensors, in particular, during unexpected drifting movements and/or accelerations along with the direction of gravity. In other words, it has been found that dynamic actions or extra accelerations including additional accelerations, in particular the one acted upon the direction substantially parallel to or along with the gravity imposed on the pointing device with the compensation methods provided by Liberty, said pointing device by Liberty cannot properly or accurately output the actual yaw, pitch and roll angles in the spatial reference frame $X_P Y_P Z_P$ and following which, consequently, the mapping of the spatial angles onto any 2D display reference frame such as $X_D Y_D Z_D$ may be greatly affected and erred. To be more specific, as the 5-axis compensation by Liberty cannot detect or compensate rotation about the $X_P$ axis directly or accurately, the rotation about the $X_P$ axis has to be derived from the gravitational acceleration detected by the accelerometer. Furthermore, the reading of the accelerometer may be accurate only when the pointing device is static since due to the limitation on known accelerometers that these sensors may not distinguish the gravitational acceleration from the acceleration of the forces including centrifugal forces or other types of additional accelerations imposed or exerted by the user.

Furthermore, it has been found that known prior arts may only be able to output a "relative" movement pattern in a 2D reference frame based on the result calculated from the signals of motion sensors. For example, the abovementioned prior arts by Liberty may only output a 2D movement pattern in a relative manner and a pointer on a display screen to show such corresponding 2D relative movement pattern. To be more specific, the pointer moves from a first location to a second new location relative to said first location only. Such relative movement from the previous location to the next location with respect to time cannot accurately determine and/or output the next location, particularly in situations where the previous location may have been an erred location or have been faultily determined as an incorrect reference point for the next location that is to be calculated therefrom and obtained based on their relative relationship adapted. One illustration of such defect of known prior arts adapting a relative relationship in obtaining a movement pattern may be clearly illustrated by an example showing the faultily outputted movements of a pointer intended to move out of a boundary or an edge of display screen. It has been found that as the pointer of known prior arts reaches the edge of a display and continues to move out of the boundary or edge at a certain extra extent beyond said boundary, the pointer fails to demonstrate a correct or "absolute" pattern as it moves to a new location either within the display or remaining outside of the boundary; in other words, instead of returning to a new location by taking into account said certain extra extend beyond the boundary made earlier in an "absolute" manner, the pointer of known arts discards such virtual distance of the extra extend beyond the boundary already made and an erred next position is faultily outputted due to the relative relationship adapted and utilized by the pointer may be never calculated or processed due to the faultily obtained location at the edge or boundary of the display as well as the relative relationship adapted to obtain its next location therefrom.

Therefore, it is clear that an improved device for use in for example motion detection, computers or navigation with enhanced calculating or comparison method capable of accurately obtaining and calculating actual deviation angles in the spatial pointer frame is needed. For applications of navigations or computers including portable communication devices integrated with displays therein, the electronic device may too include the mapping of such actual angles onto a cursor, pointer or position information on the display frame in dynamic environments and conditions including undesirable external interferences. In addition, as the trend of 3D technology advances and is applicable to various fields including displays, interactive systems and navigation, there is a significant need for an electronic device, including for example a motion detector, a 3D pointing device, a navigation equipment, or a communication device integrated with motion sensors therein, capable of accurately outputting a deviation of such device readily useful in a 3D or spatial reference frame. Furthermore, there is a need to provide an enhanced comparison method and/or model applicable to the processing of signals of motion sensors such that errors and/or noises associated with such signals or fusion of signals from the motions sensors may be corrected or eliminated. In addition, according to the field of application, such output of deviation in 3D reference frame may too be further mapped or translated to a pattern useful in a 2D reference frame.

SUMMARY OF THE INVENTION

According to one aspect of an exemplary embodiment of the present invention, an electronic device utilizing a nine-axis motion sensor module for use in for example computers, motion detection or navigation is provided. The electronic device comprises an accelerometer to measure or detect axial accelerations Ax, Ay, Az, a magnetometer to measure or detect magnetism Mx, My, Mz and a rotation sensor to measure or detect angular velocities $\omega_x$, $\omega_y$, $\omega_z$ such that resulting deviation including resultant angles comprising yaw, pitch and roll angles in a spatial pointer frame of the electronic device subject to movements and rotations in dynamic environments may be obtained and such that said resulting deviation including said resultant angles may be obtained and outputted in an absolute manner reflecting or associating with the actual movements and rotations of the electronic device of the present invention in said spatial pointer reference frame and preferably excluding undesirable external interferences in the dynamic environments.

According to another aspect of the present invention, the present invention provides an enhanced comparison method and/or model to eliminate the accumulated errors as well as noises over time associated with signals generated by a combination of motion sensors, including the ones generated by accelerometers $A_x$, $A_y$, $A_z$, the ones generated by magnetometers $M_x$, $M_y$, $M_z$ and the ones generated by gyroscopes $\omega_x$, $\omega_y$, $\omega_z$ in dynamic environments. In other words, accumulated errors associated with a fusion of signals from a motions sensor module comprising a plurality of motion sensors to detect movements on and rotations about different axes of a reference frame may be eliminated or corrected.

According to still another aspect of the present invention, the present invention provides an enhanced comparison method to correctly calculating and outputting a resulting deviation comprising a set of resultant angles including yaw, pitch and roll angles in a spatial pointer frame, preferably about each of three orthogonal coordinate axes of the spatial pointer reference frame, by comparing signals of rotation sensor related to angular velocities or rates with the ones of accelerometer related to axial accelerations and the ones of magnetometer related to magnetism such that these angles may be accurately outputted and obtained, which may too be further mapping to another reference frame different from said spatial pointer frame.

In the event of interferences including external interferences introduced by either the device user or the surrounding environment, such as external electromagnetic fields, according to still another aspect of the present invention, the present invention provides a unique update program comprising a data association model to intelligently process signals received from a motion sensor module to output a resultant deviation preferably in 3D reference frame such that the adverse effects caused by the interferences may be advantageously reduced or compensated.

According to still another aspect of the present invention, the present invention further provides a mapping of the abovementioned resultant angles, preferably about each of three orthogonal coordinate axes of the spatial pointer reference frame, including yaw, pitch and roll angles in a spatial pointer reference frame onto a display frame either external to the device of the present invention or integrated therein such that a movement pattern in a display frame different from the spatial pointer reference frame may be obtained according to the mapping or translation of the resultant angles of the resultant deviation onto said movement pattern.

According to another example embodiment of the present invention, an electronic device capable of generating 3D deviation angles and for use in for example computers, motion detection or navigation is provided. The electronic device may utilize a nine-axis motion sensor module with an enhanced comparison method or model for eliminating accumulated errors of said nine-axis motion sensor module to obtain deviation angles corresponding to movements and rotations of said electronic device in a spatial pointer reference frame. The comparison method or model may be advantageously provided by comparing signals from the abovementioned nine-axis motion sensor module capable of detecting rotation rates or angular velocities of the electronic device about all of the $X_P$, $Y_P$ and $Z_P$ axes as well as axial accelerations and ambient magnetism including such as earth's magnetic field or that of other planets of the electronic device along all of the $X_P$, $Y_P$ and $Z_P$ axes such that deviation angles of the resultant deviation of the electronic device of the present invention may be preferably obtained or outputted in an absolute manner. In other words, the present invention is capable of accurately outputting the abovementioned deviation angles including yaw, pitch and roll angles in a 3D spatial pointer reference frame of the 3D pointing device to eliminate or reduce accumulated errors and noises generated over time in a dynamic environment including conditions such as being subject to a combination of continuous movements, rotations, external gravity forces, magnetic field and additional extra accelerations in multiple directions or movement and rotations that are continuously nonlinear with respect to time; and furthermore, based on the deviation angles being compensated and accurately outputted in 3D spatial reference frame may be further mapped onto or translated into another reference frame such as the abovementioned display frame, for example a reference in two-dimension (2D).

According to another example embodiment of the present invention, a 3D pointing device utilizing a nine-axis motion sensor module is provided; wherein the nine-axis motion sensor module of the 3D pointing device comprises at least one gyroscope, at least one accelerometer and at least one magnetometer. In one preferred embodiment of the present invention, the nine-axis motion sensor module comprises a rotation sensor capable of detecting and generating angular velocities of $\omega_x$, $\omega_y$, $\omega_z$, an accelerometer capable of detecting and generating axial accelerations of Ax, Ay, Az, and a magnetometer capable of detecting and generating magnetism of Mx, My, Mz. It can be understood that in another embodiment, the abovementioned rotation sensor may comprise three gyroscopes corresponding to each of the said angular velocities of $\omega_x$, $\omega_y$, $\omega_z$ in a 3D spatial reference frame of the 3D pointing device; whereas the abovementioned accelerometer may comprise three accelerometers corresponding to each of the said axial accelerations Ax, Ay, Az in a 3D spatial reference frame of the 3D pointing device; and whereas the abovementioned magnetometer may comprise three magnetic sensors such as magneto-impedance (MI) sensors or magneto-resistive (MR) sensors corresponding to each of the said magnetism Mx, My, Mz in a 3D spatial reference frame of the electronic device. The rotation sensor detects the rotation of the 3D pointing device with respect to a reference frame associated with the 3D pointing device and provides a rotation rate or angular velocity output. The angular velocity output includes three components corresponding to the rotation rate or angular velocities $\omega_x$, $\omega_y$, $\omega_z$ of the 3D pointing device about the first axis, the second axis and the third axis of the reference frame, namely, $X_p$, $Y_p$ and $Z_p$ of the 3D spatial frame. The accelerometer detects the axial accelerations of the 3D pointing device with respect to the spatial reference frame such as a 3D-pointer reference frame and provides an acceleration output. The acceleration output includes three components corresponding to the accelerations, Ax, Az, Ay of the 3D pointing device along the first axis, the second axis and the third axis of the reference frame, namely, $X_p$, $Y_p$ and $Z_p$ of the 3D spatial reference frame. The magnetometer detects the magnetism of the electronic device with respect to the spatial reference frame such as a 3D reference frame and provides an magnetism output. The magnetism output includes three components corresponding to the magnetism, Mx, My, Mz of the 3D pointing device along the first axis, the second axis and the third axis of the reference frame, namely, $X_p$, $Y_p$ and $Z_p$ of the 3D spatial frame. It can, however, be understood that the axes of $X_p$, $Y_p$ and $Z_p$ of the 3D spatial reference frame may too be represented simply by the denotation of X, Y and Z.

According to another example embodiment of the present invention, a method for compensating accumulated errors of signals of the abovementioned nine-axis motion sensor module in dynamic environments associated in a spatial reference frame is provided. In one embodiment, the method may be performed or handled by a hardware processor. The processor is capable of compensating the accumulated errors associated with the resultant deviation in relation to the signals of the abovementioned nine-axis motion sensor module of the 3D pointing device subject to movements and rotations in a spatial reference frame and in a dynamic environment by performing a data comparison to compare signals of rotation sensor related to angular velocities with the ones of accelerometer related to axial accelerations and the ones of magnetometer related to magnetism such that the resultant deviation corresponding to the movements and rotations of the 3D pointing device in the 3D spatial reference frame may be obtained accurately over time in the dynamic environments.

According to another embodiment of the present invention, a method for obtaining a resulting deviation including resultant angles in a spatial reference frame of a three-dimensional (3D) pointing device utilizing a nine-axis motion sensor module therein and subject to movements and rotations in dynamic environments in said spatial reference frame is provided. Said method comprises the steps of: obtaining a previous state associated with previous angular velocities $\omega_x$, $\omega_y$, $\omega_z$ gained from the motion sensor signals of the nine-axis motion sensor module at a previous time T−1; obtaining a current state of the nine-axis motion sensor module by obtaining measured angular velocities $\omega_x$, $\omega_y$, $\omega_z$ gained from the motion sensor signals at a current time T; obtaining a measured state of the nine-axis motion sensor module by obtaining measured axial accelerations Ax, Ay, Az and measured magnetism $M_x$, $M_y$, $M_z$ gained from the motion sensor signals at the current time T and calculating predicted axial accelerations Ax', Ay', Az' and predicted magnetism $M_x'$, $M_y'$, $M_z'$ based on the measured angular velocities $\omega_x$, $\omega_y$, $\omega_z$ of the current state; obtaining an updated state of the nine-axis motion sensor module by comparing the current state with the measured state of the nine-axis motion sensor module; and calculating and converting the updated state of the nine-axis motion sensor module to said resulting deviation comprising said resultant angles in said spatial reference frame of the 3D pointing device.

According to another aspect of the present invention, a method for mapping deviation angles associated with movements and rotations of a 3D pointing device in a spatial reference frame onto a display frame of a display having a predetermined screen size is provided. In one embodiment, the method for mapping or translating deviation angles including yaw, pitch and roll angles in a spatial reference frame to an pointing object, such as a pointer, having movements in a display frame, preferably a 2D reference frame, comprises the steps of obtaining boundary information of the display frame by calculating a predefined sensitivity associated with the display frame and performing angle and distance translation in the display frame based on said deviation angles and boundary information.

According to another embodiment of the present invention, a method for obtaining a resulting deviation including resultant angles in a spatial reference frame of a three-dimensional pointing device utilizing a nine-axis motion sensor module therein and subject to movements and rotations in dynamic environments in said spatial reference frame is provided. Said method comprises the steps of: obtaining a previous state of the nine-axis motion sensor module; wherein the previous state includes an initial-value set associated with at least previous angular velocities gained from the motion sensor signals of the nine-axis motion sensor module at a previous time T−1; obtaining a current state of the nine-axis motion sensor module by obtaining measured angular velocities $\omega_x$, $\omega_y$, $\omega_z$ gained from the motion sensor signals of the nine-axis motion sensor module at a current time T; obtaining a measured state of the nine-axis motion sensor module by obtaining measured axial accelerations Ax, Ay, Az gained from the motion sensor signals of the nine-axis motion sensor module at the current time T and calculating predicted axial accelerations Ax', Ay', Az' based on the measured angular velocities ωx, ωy, ωz of the current state of the nine-axis motion sensor module; obtaining a first updated state of the nine-axis motion sensor module by comparing the current state with the measured state of the nine-axis motion sensor module; obtaining the measured state of the nine-axis motion sensor module by obtaining and calculating a measured yaw angle gained from the motion sensor signals of the nine-axis motion sensor module at the current time T and calculating a predicted yaw angle based on the first updated state of the nine-axis motion sensor module; obtaining a second updated state of the nine-axis motion sensor module by comparing the current state with the measured state of the nine-axis motion sensor module; and calculating and converting the second updated state of the nine-axis motion sensor module to said resulting deviation comprising said resultant angles in said spatial reference frame of the electronic device.

BRIEF DESCRIPTION OF THE DRAWINGS

The accompanying drawings are included to provide a further understanding of the invention, and are incorporated herein for illustrative purposes only. The drawings illustrate embodiments of the invention and, together with the description, serve to only illustrate the principles of the invention.

DESCRIPTION OF PREFERRED EMBODIMENTS

Figure 1:
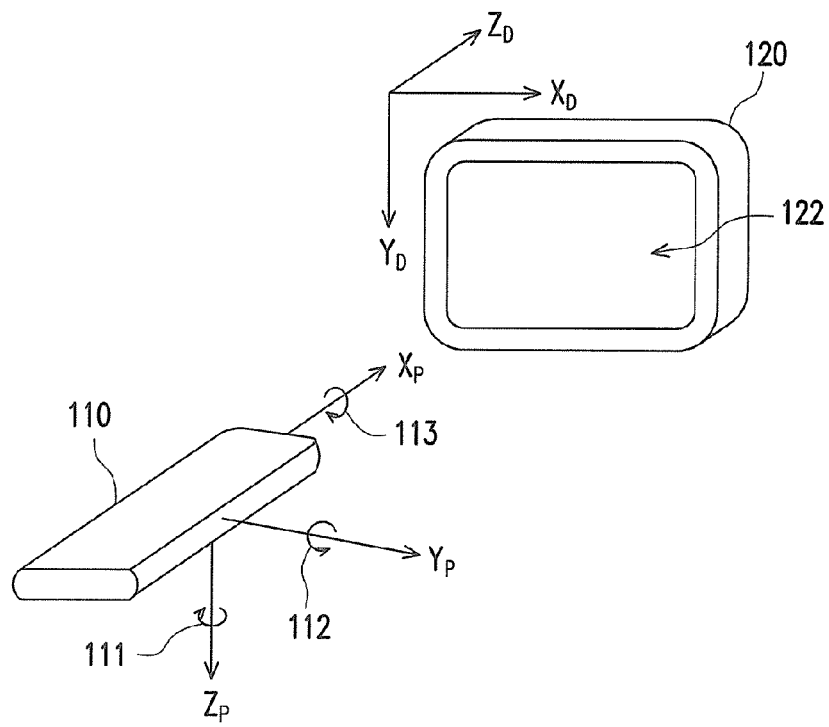
FIG. 1 shows a known related art having a 5-axis motion sensor in 2D reference frame.

Detailed descriptions of preferred embodiments of the present invention recited herein are provided for illustrative purposes only; examples of which are too illustrated in the accompanying drawings. In addition, similar reference numbers in the drawings and the description may too refer to similar parts or components.

Figure 2:
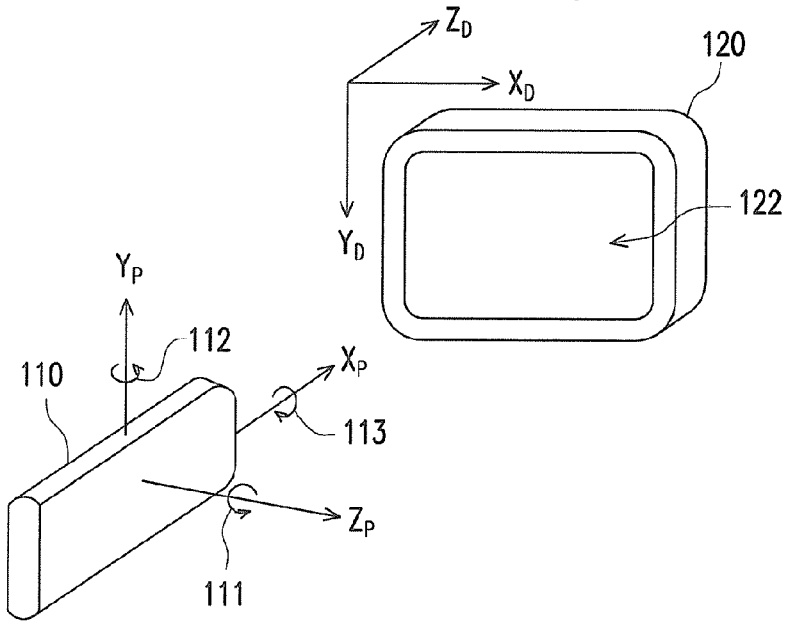
FIG. 2 shows the known related art having a 5-axis motion sensor as shown in FIG. 1 being rotated or rolled about $X_p$ axis and is subject to further dynamic interactions or environment.
Figure 3:
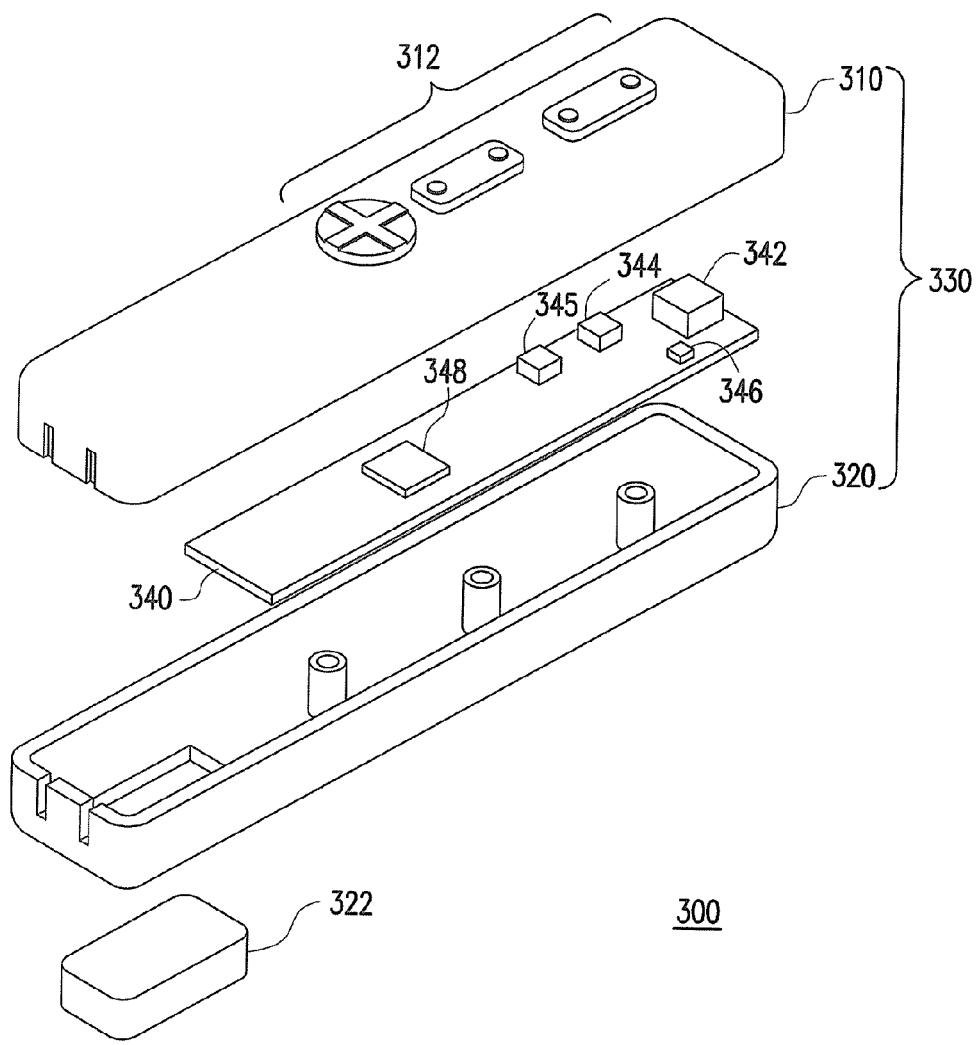
FIG. 3 is an exploded diagram showing an electronic device of the present invention, such as a pointing device, utilizing a nine-axis motion sensor module according to one embodiment of the present invention.

FIG. 3 is an exploded diagram showing an electronic device 300 according to one embodiment of the present invention, such as a pointing device. The electronic device 300 is subject to movements and rotations in dynamic environments in a spatial reference frame such as a 3D reference frame. The spatial reference frame is analogous to the reference frame $X_P Y_P Z_P$ also shown in FIG. 1 and FIG. 2. The movements and rotations of the electronic device 300, such as a pointing device, in the aforementioned dynamic environments in the spatial reference frame may be continuously nonlinear with respect to time. The term of "dynamic" recited herein may refer to moving or subject to motions in general.

The electronic device 300 includes a top cover 310, a printed circuit board (PCB) 340, a rotation sensor 342, an accelerometer 344, a magnetometer 345, a data transmitting unit 346, a computing processor 348, a bottom cover 320, and a battery pack 322. The top cover 310 may include a few control buttons 312 for a user to issue predefined commands for remote control. In one embodiment, the housing 330 may comprise the top cover 310 and the bottom cover 320. The housing 330 may move and rotate in the spatial reference frame according to user manipulation or any external forces in any direction and/or under the abovementioned dynamic environments. As shown in the FIG. 3, in one embodiment, the rotation sensor 342, the accelerometer 344, the magnetometer 345, the data transmitting unit 346, and the computing processor 348 may be all attached to the PCB 340. The PCB 340 is enclosed by the housing 330. The PCB 340 includes at least one substrate having a longitudinal side configured to be substantially parallel to the longitudinal surface of the housing 330. An additional battery pack 322 provides electrical power for the electronic device 300.

Furthermore, in one embodiment, the abovementioned dynamic environments, in which the electronic device 300 of the present invention may be present or subject to, may include undesirable external interferences to the electronic device 300 of the present invention. In one example, the undesirable external interferences may refer to or include undesirable axial accelerations caused by undesirable external forces other than a force of gravity. In another example, the undesirable external interferences may also refer to or include undesirable magnetism caused by undesirable electromagnetic fields.

Figure 4:
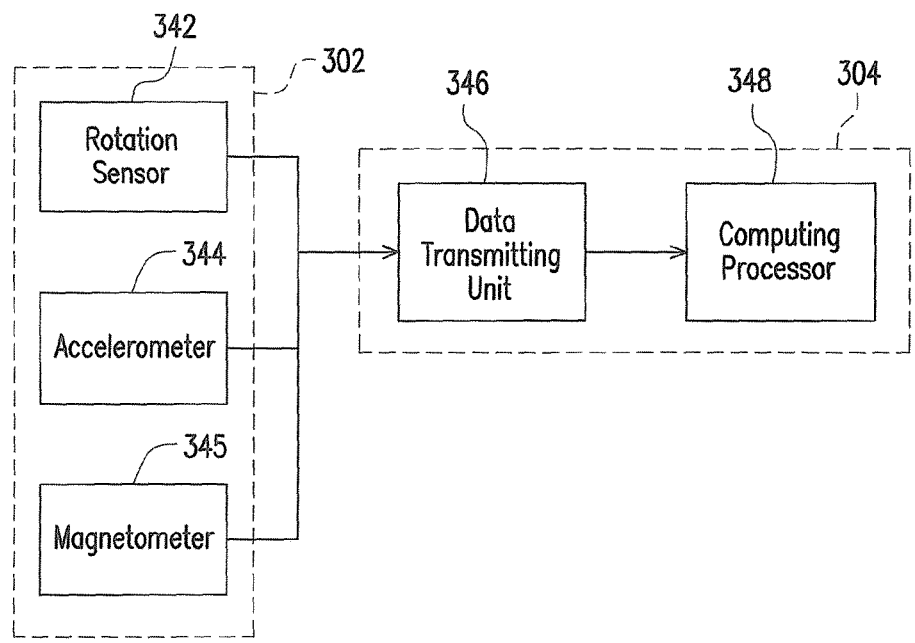
FIG. 4 is a schematic block diagram illustrating hardware components of an electronic device according to one embodiment of the present invention.

FIG. 4 is a schematic block diagram illustrating hardware components of the electronic device 300. The electronic device 300 includes a nine-axis motion sensor module 302 and a processing and transmitting module 304. The nine-axis motion sensor module 302 includes the rotation sensor 342, the accelerometer 344 and the magnetometer 345. The processing and transmitting module 304 includes the data transmitting unit 346 and the computing processor 348.

The term "nine-axis" recited herein may refer to and generally include the three angular velocities $\omega_x$, $\omega_y$, $\omega_z$, the three axial accelerations Ax, Ay, Az, and the three magnetism Mx, My, Mz. The rotation sensor 342 of the nine-motion sensor module 302 detects and generates the first signal set including angular velocities $\omega_x$, $\omega^y$, $\omega_z$ associated with the movements and rotations of the electronic device 300 about each of three orthogonal coordinate axes $X_P Y_P Z_P$ of the spatial reference frame. The angular velocities $\omega_x$, $\omega_y$, and $\omega_z$ are corresponding to the coordinate axes $X_P$, $Y_P$ and $Z_P$ respectively. The accelerometer 344 detects and generates the second signal set including axial accelerations Ax, Ay, Az associated with the movements and rotations of the electronic device 300 along each of the three orthogonal coordinate axes $X_P Y_P Z_P$ of the spatial reference frame. The axial accelerations Ax, Ay and Az are corresponding to the coordinate axes $X_P$, $Y_P$ and $Z_P$ respectively. The magnetometer 345 of the nine-motion sensor module 302 detects and generates the third signal set including magnetism Mx, My, Mz associated with the movements and rotations of the electronic device 300 along each of the three orthogonal coordinate axes $X_P Y_P Z_P$ of the spatial reference frame. The magnetism Mx, My and Mz represent the strength and/or direction of ambient magnetic field (such as the magnetic field of the Earth) of the electronic device 300. The magnetism Mx, My and Mz are corresponding to the coordinate axes $X_P$, $Y_P$ and $Z_P$ respectively. It too can be understood that the abovementioned nine axes of $X_P Y_P Z_P$ may not need to be orthogonal in a specific orientation and they may be rotated in different orientations; the present invention discloses such coordinate system for illustrative purposes only and any coordinates in different orientation and/or denotations may too be possible.

Furthermore, in one embodiment of the present invention, the motion sensor module or nine-axis motion sensor module 302 of the electronic device 300 may refer to a Micro-Electro-Mechanical-System (MEMS) type of sensor. In an explanatory example, the abovementioned rotation sensor 342 of the nine-axis motion sensor module 302 may further comprise at least one resonating mass such that a movement of said at least one resonating mass along an axis of said spatial reference frame may be detected and measured by said rotation sensor using the Coriolis acceleration effect to generate said first signal set comprising angular velocities $\omega x$, $\omega y$, $\omega z$ in said spatial reference frame. It can be understood that for a three-axis rotation sensor of a MEMS type sensor, there may be positioned three resonating masses along each of X, Y and Z axes of the spatial reference frame to generate and obtain movements or displacements of the three resonating masses thereof. It can too be understood that the nine-axis motion sensor 302 of the present invention may also include a three-axis accelerometer, a three-axis rotation sensor and a three-axis magnetometer in a MEMS structure.

The data transmitting unit 346 is electrically connected to the nine-axis motion sensor module 302 for transmitting the first, second and third signal sets. The data transmitting unit 346 transmits the first, second and third signal sets of the nine-axis motion sensor module 302 to the computing processor 348 preferably via electronic connections configured on the PCB 340. The computing processor 348 receives and calculates the first, second and third signal sets from the data transmitting unit 346. The computing processor 348 further communicates with the nine-axis motion sensor module 302 to calculate the resulting deviation of the electronic device 300 including three resultant angles preferably about each of the three axes of the spatial reference frame. The resultant angles include the yaw angle 111, the pitch angle 112 and the roll angle 113 as shown in FIG. 1 and FIG. 2. In order to calculate the resulting deviation, the computing processor 348 may utilize a comparison or algorithm to eliminate accumulated errors of the first, second and/or third signal sets of the nine-axis motion sensor module 302, whereby the resultant angles in the spatial reference frame, preferably about each of three orthogonal coordinate axes of the spatial reference frame, of the resulting deviation of the nine-axis motion sensor module 302 of the electronic device 300 is obtained under the aforementioned dynamic environments excluding the abovementioned undesirable external interferences and such that it is preferably obtained and outputted in an absolute manner reflecting or associating with the actual movements and rotations of the electronic device 300, including such as a pointing device, of the present invention in said spatial reference frame. In addition, said comparison utilized by the computing processor 348 may further comprise an update program to obtain an updated state of the nine-axis motion sensor module based on a previous state associated with a first signal set in relation to the angular velocities $\omega_x$, $\omega_y$, $\omega_z$ and a measured state associated with both said second and third signal sets in relation to the axial accelerations Ax, Ay, Az as well as magnetism Mx, My, Mz. The abovementioned measured state may include a measurement of said second signal set or measured Ax, Ay, Az and a predicted measurement of Ax', Ay' and Az' obtained based on or calculated from a current state of the motion sensor module 302. In addition, the abovementioned measured state may too include a measurement of said third signal set or measured Mx, My, Mz and a predicted measurement of Mx', My' and Mz' obtained based on or calculated from the current state of the motion sensor module 302. Details of different "states" of the nine-axis motion sensor module 302 of the electronic device 300 of the present invention are provided in the later content.

In one embodiment, the computing processor 348 of the processing and transmitting module 304 may further include a mapping program for translating the resultant angles of the resulting deviation in the spatial reference frame to a movement pattern in a display reference frame different from the spatial reference frame. The display reference frame is analogous to the reference frame $X_D Y_D Z_D$ in FIG. 1 and FIG. 2. The movement pattern may be displayed on a screen of a 2D display device similar to the display device 120 in FIG. 1 and FIG. 2. The mapping program translates the resultant angles, preferably about each of the three orthogonal coordinate axes of the spatial reference frame to the movement pattern according to a sensitivity input correlated to the display reference frame.

Figure 5:
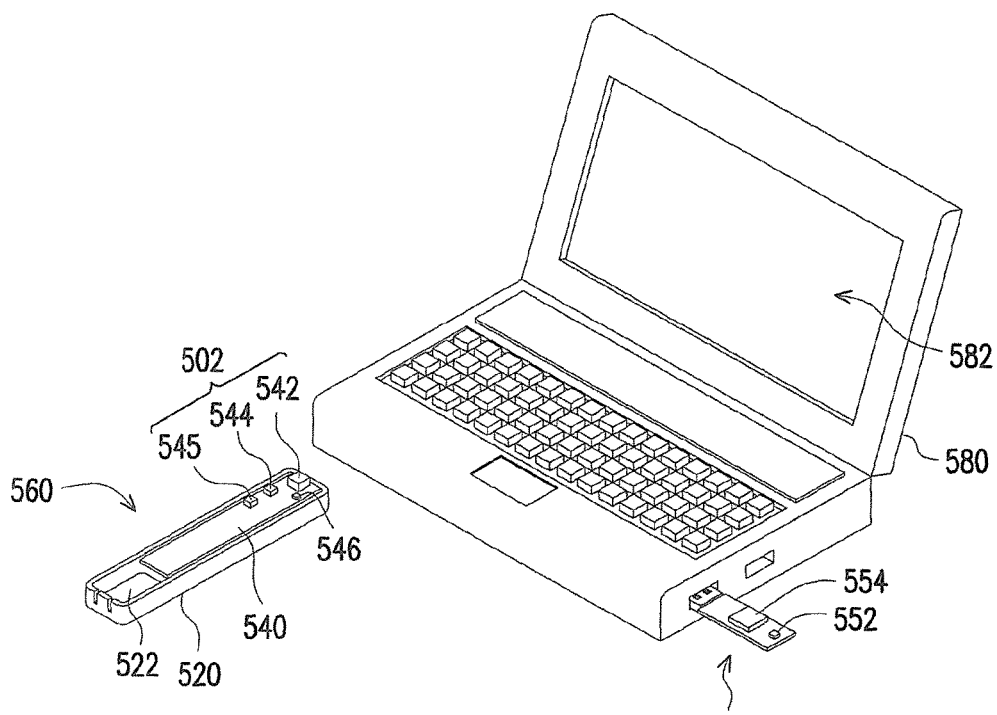
FIG. 5 is a schematic diagram showing another embodiment of an electronic device of the present invention, such as a pointing device, utilizing a nine-axis motion sensor module as well as an external processor.

FIG. 5 is a schematic diagram showing an electronic device 500 utilizing a nine-axis motion sensor module according to anther embodiment of the present invention in a 3D spatial reference frame. As shown in FIG. 5, the electronic device 500 may comprise two parts 560 and 570 in data communication with each other. In one embodiment, the first part 560 includes a top cover (not shown), a PCB 540, a nine-axis motion sensor module 502 comprising a rotation sensor 542, an accelerometer 544 and a magnetometer 545, a data transmitting unit 546, a bottom cover 520, and a battery pack 522. The data transmitting unit 546 transmits the first signal set ($\omega_x$, $\omega_y$, $\omega_z$) generated by the rotation sensor 542 of the nine-motion sensor module 502 and the second signal set (Ax, Ay, Az) generated by the accelerometer 544 as well as the third signal set (Mx, My, Mz) generated by the magnetometer 545 of the nine-motion sensor module 502 to the data receiving unit 552 of the second part 570 via wireless communication or connection including wireless local area network (WLAN) based on IEEE 802.11 standards or Bluetooth™. It can be understood that in another embodiment, wired communication or connection via a physical cable or electrical wires connecting the first part 560 and the second part 570 may too be possible. In one embodiment of the present invention, the motion sensor module or nine-axis motion sensor module 502 of the electronic device 500 may refer to a MEMS type of sensor. In an explanatory example, the abovementioned rotation sensor 542 of the nine-axis motion sensor module 502 may further comprise at least one resonating mass such that a movement of said at least one resonating mass along an axis of said spatial reference frame may be detected and measured by said rotation sensor using the Coriolis acceleration effect to generate said first signal set comprising angular velocities $\omega x$, $\omega y$, $\omega z$ in said spatial reference frame. It can be understood that for a three-axis rotation sensor of a MEMS type sensor, there may be positioned three resonating masses along each of X, Y and Z axes of the spatial reference frame to generate and obtain movements or displacements of the three resonating masses thereof. It can too be understood that the nine-axis motion sensor 502 of the present invention may also include a three-axis accelerometer, a three-axis rotation sensor and a three-axis magnetometer in a MEMS structure.

In one embodiment, the second part 570 may be an external processing device to be adapted to another electronic computing apparatus or system such as a standalone personal computer or server 580; for instance, the second part 570 may be coupled or adapted to an laptop computer via a standard interface, such as the universal serial bus (USB) interface depicted as shown in FIG. 5. The first part 560 and the second part 570 communicate via the data transmitting unit 546 and the data receiving unit 552. As previously mentioned, the data transmitting unit 546 and the data receiving unit 552 may communicate through wireless connection or wired connection. In other words, in terms of hardware configuration and data transmission, in one embodiment of the present invention, the nine-axis motion sensor module 502 comprising the rotation sensor 542, the accelerometer 544 and the magnetometer 545 may be disposed distally from the processing unit or computing processor 554; the signals from the nine-axis motion sensor module 502 may then be transmitted via the data transmitting units 546, 552 to the computing processor 554 via wired or wireless communication including for example IEEE 802.11 standards or Bluetooth™.

The second part 570 of the electronic device 500 according to one embodiment of the present invention comprises the data transmitting unit 552 and the processor 554. The data transmitting unit 552 of the second part 570 may be in data communication with the other data transmitting unit 546 disposed distally therefrom in the first part 560 as previously mentioned. The data transmitting unit 552 in the second part 570 receives the first, second and third signal sets from the data transmitting unit 546 in the first part 560 and transmits the first, second and third signal sets to the computing processor 554. In one embodiment, the computing processor 554 performs the aforementioned calculation as well as comparison of signals. In one embodiment, said comparison utilized by the computing processor 554 may further comprise an update program to obtain an updated state based on or from a previous state associated with said first signal set and a measured state associated with said second and third signal sets. The measured state may further include a measurement of said second and third signal sets and predicted measurements obtained based on the first signal set or based on a current state of the motion sensor module 502. The computing processor 554 is external to the housing of the 3D pointing device as depicted in FIG. 5. In one embodiment, the computing processor 554 also performs mapping by translating the resultant angles of the resulting deviation of the electronic device in the spatial pointer reference frame, preferably about each of three orthogonal coordinate axes of the spatial reference frame, to a movement pattern in a display reference frame associated with the notebook computer 580. The movement pattern may be displayed on the screen 582 of the notebook computer 580.

Figure 6:
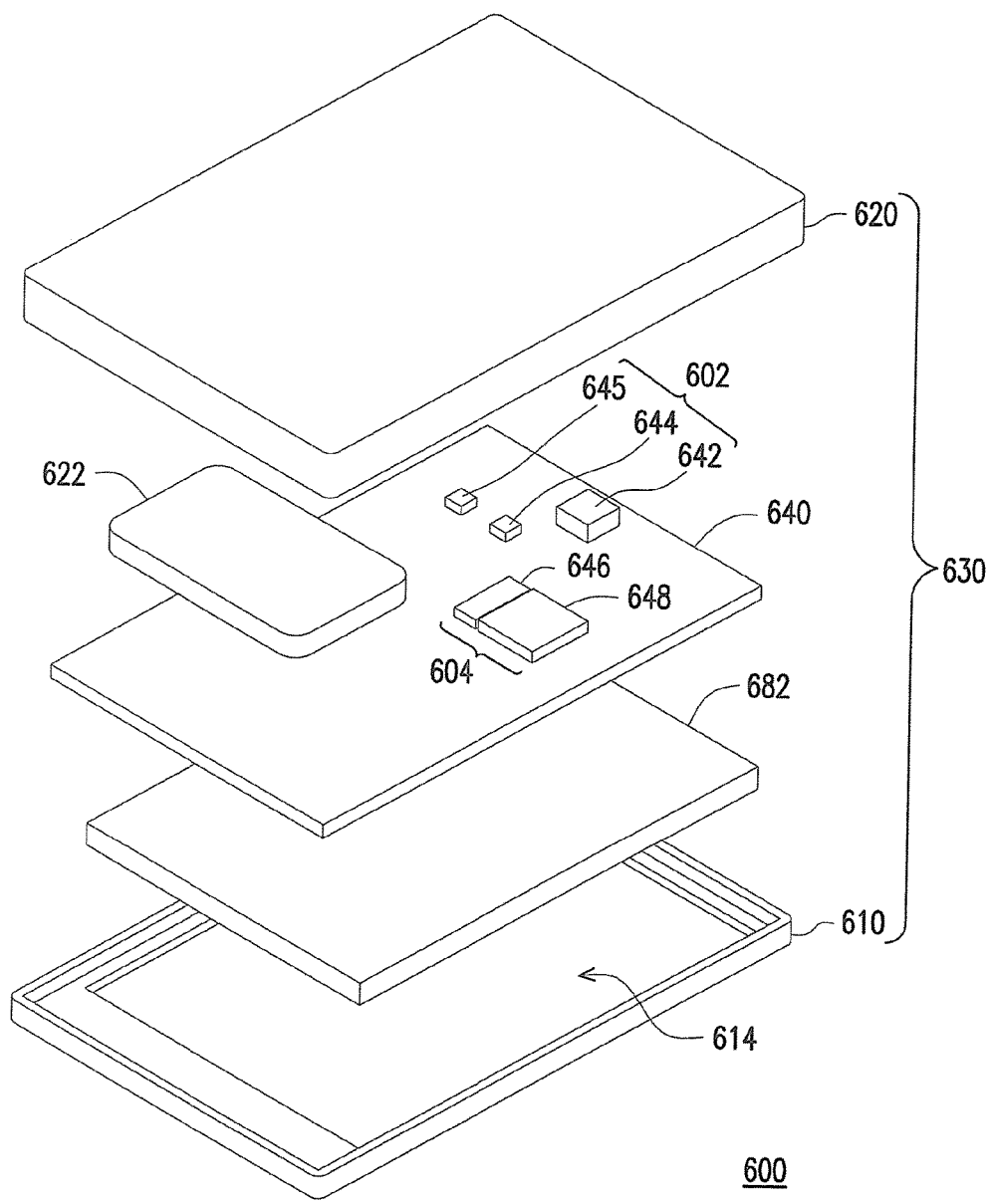
FIG. 6 is an exploded diagram showing still another embodiment of an electronic device of the present invention, such as a smartphone or navigation equipment, utilizing a nine-axis motion sensor module according to anther embodiment of the present invention.

FIG. 6 is an exploded diagram showing a portable electronic device 600, such as for example a 3D pointing device, utilizing a nine-axis motion sensor module according to anther embodiment of the present invention in a 3D spatial reference frame. The portable electronic device 600 may further comprises a built-in display 682; examples of the portable electronic device 600 as an explanatory embodiment of the present invention may include such as smartphone, tablet PC or navigation equipment. In other words, the abovementioned display reference frame associated with a display may need not to be external to the spatial reference frame in terms of the hardware configuration of the present invention. In one embodiment, the electronic device 600 comprises a bottom cover 620, a PCB 640, a battery pack 622, a rotation sensor 642, an accelerometer 644, a magnetometer 645, a data transmitting unit 646, a computing processor 648, a display 682, and a top cover 610. Likewise, in one embodiment, the housing 630 may comprise the top and bottom covers 610, 620. A built-in display 682 may too be integrated on the housing 630; the nine-axis motion sensor module 602 may comprise the rotation sensor 642, the accelerometer 644 and the magnetometer 645. The data transmitting unit 646 and the computing processor 648 may also be integrated as a processing and transmitting module 604 of the electronic device 600. In one embodiment of the present invention, the motion sensor module or nine-axis motion sensor module 602 of the portable electronic device 600 may refer to a MEMS type of sensor. In an explanatory example, the abovementioned rotation sensor 642 of the nine-axis motion sensor module 602 may further comprise at least one resonating mass such that a movement of said at least one resonating mass along an axis of said spatial reference frame may be detected and measured by said rotation sensor using the Coriolis acceleration effect to generate said first signal set comprising angular velocities ωx, ωy, ωz in said spatial reference frame. It can be understood that for a three-axis rotation sensor of a MEMS type sensor, there may be positioned three resonating masses along each of X, Y and Z axes of the spatial reference frame to generate and obtain movements or displacements of the three resonating masses thereof. It can too be understood that the nine-axis motion sensor 602 of the present invention may also include a three-axis accelerometer, a three-axis rotation sensor and a three-axis magnetometer in a MEMS structure.

The computing processor 648 of the processing and transmitting module 604 may too perform the mapping of resultant deviation from or in said spatial reference frame or 3D reference frame to a display reference frame such as a 2D reference frame by translating the resultant angles of the resulting deviation of the electronic device 600 in the spatial reference frame, preferably about each of three orthogonal coordinate axes of the spatial reference frame to a movement pattern in a display reference frame associated with the electronic device 600 itself. The display 682 displays the aforementioned movement pattern. The top cover 610 includes a transparent area 614 for the user to see the display 682.

Figure 7:
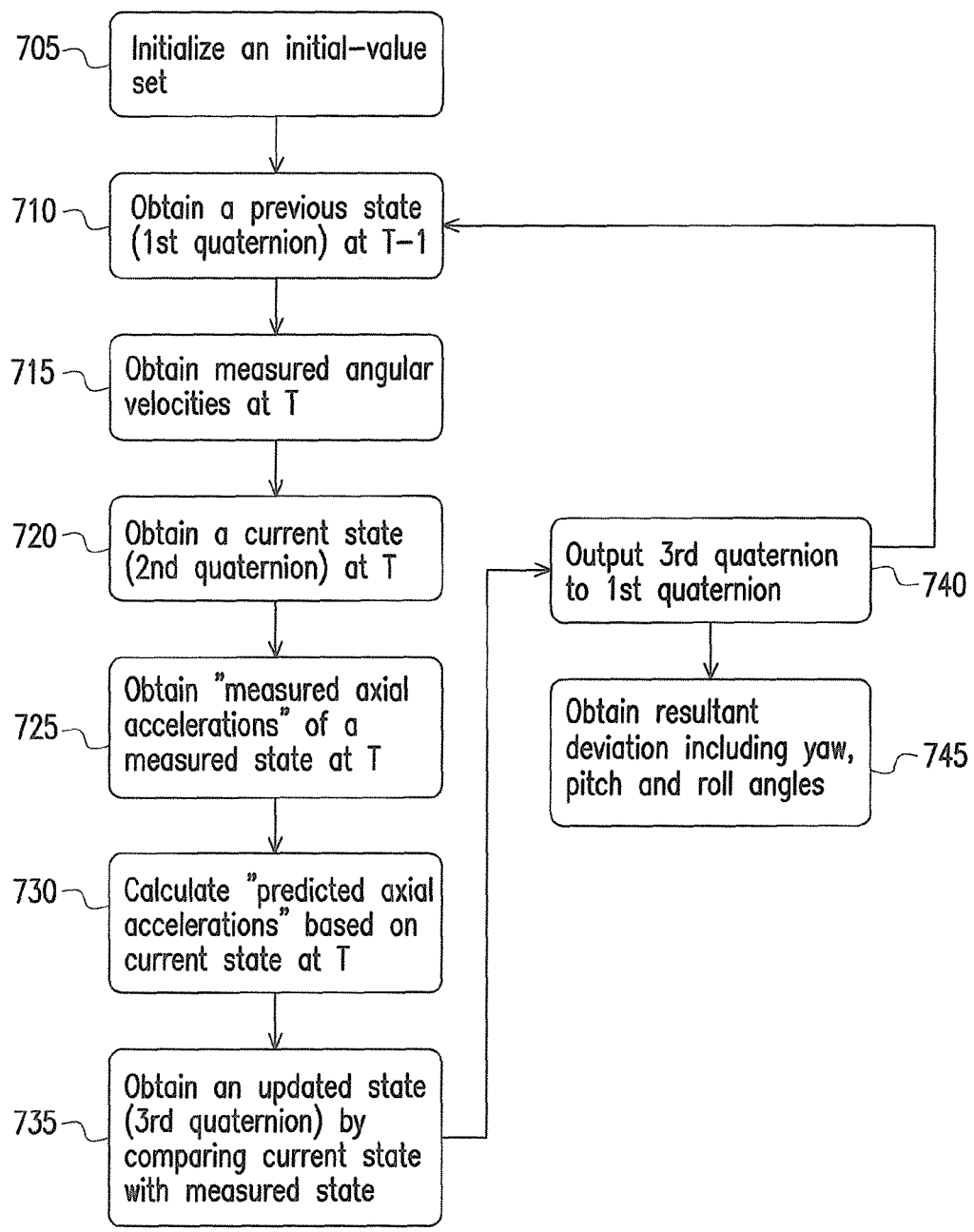
FIG. 7 is a flow chart illustrating a method for obtaining a resultant deviation of an electronic device of the present invention subject to movements and rotations in a spatial reference frame.

FIG. 7 is an explanatory flow chart illustrating a method for obtaining and/or outputting a resultant deviation including deviation angles in a spatial reference frame of an electronic device, including such as a pointing device, navigation equipment or smartphone, having movements and rotations in a 3D spatial reference frame and in dynamic environments according to an embodiment of the present invention. The method in FIG. 7 may be a program such as an algorithm or a comparison model to be embedded or performed by the processing unit or computing processor 348, 554, 648 of the processing and transmitting module according to different embodiments of the present invention recited herein for illustrative purposes.

Accordingly, in one embodiment of the present invention, a method for obtaining a resultant deviation including deviation angles in a spatial reference frame of an electronic device utilizing a nine-axis motion sensor module therein in dynamic environments and preferably excluding undesirable external interferences thereof is provided. As the electronic device may be subject to movements and rotations in the dynamic environments, undesirable interferences may cause the measurements, calculations or outputs of the motion sensor module thereof to be errorsome. In one embodiment, said method may comprise the following steps. First of all, as shown in FIG. 7, different states including "previous state", "current state", "measured state" and "update state" of the nine-axis motion sensor module may be provided to represent a step or a set of steps utilized by the method for obtaining the resulting deviation in 3D reference frame, and preferably in the abovementioned "absolute" manner. In one exemplary embodiment, the method comprises the steps of obtaining a previous state of the nine-axis motion sensor module (such as steps 705, 710); and wherein the previous state may too include an initial-value set predetermined to initialize said previous state of the nine-axis motion sensor module at a beginning of the method. The initial-value set may preferably be utilized at said beginning of the method or a start of the method where a previous state is not available to be obtained from an updated state (to be recited hereafter). In another embodiment where previous state may be obtained or updated from an updated state, said previous state may be a first quaternion inducing values associated with at least previous angular velocities $\omega_x$, $\omega_y$, $\omega_z$ gained from the motion sensor signals of the nine-axis motion sensor module at a previous time T−1. A current state of the nine-axis motion sensor module may then be subsequently obtained by obtaining measured angular velocities $\omega_x$, $\omega_y$, $\omega_z$ gained from the motion sensor signals of the nine-axis motion sensor module at a current time T (such as steps 715, 720). A measured state of the nine-axis motion sensor module may then be obtained by obtaining measured axial accelerations Ax, Ay, Az gained from the motion sensor signals of the nine-axis motion sensor module at the current time T (such as step 725). Furthermore, the step of calculating predicted axial accelerations Ax', Ay', Az' based on the measured angular velocities $\omega_x$, $\omega_y$, $\omega_z$ of the current state of the nine-axis motion sensor module (such as step 730); obtaining an updated state of the nine-axis motion sensor module by comparing the current state with the measured state of the nine-axis motion sensor module (such as step 735); and calculating and converting the updated state of the nine-axis motion sensor module to said resulting deviation comprising said resultant angles in said spatial reference frame of the electronic device (745) may then be performed and obtained; and whereby the resultant deviation comprising deviation angles associated with the updated state of the nine-axis motion module may be obtained excluding said undesirable external interferences in the dynamic environments. In order to provide a continuous loop such as performed in a looped manner, the result of the updated state of the nine-axis motion sensor module may preferably be outputted to the previous state; in one embodiment, the updated state may be a quaternion, namely third quaternion as shown in the figure, such that it may be directly outputted to the abovementioned previous state of another quaternion, namely the abovementioned first quaternion and as shown in the figure (such as step 740).

Figure 8:
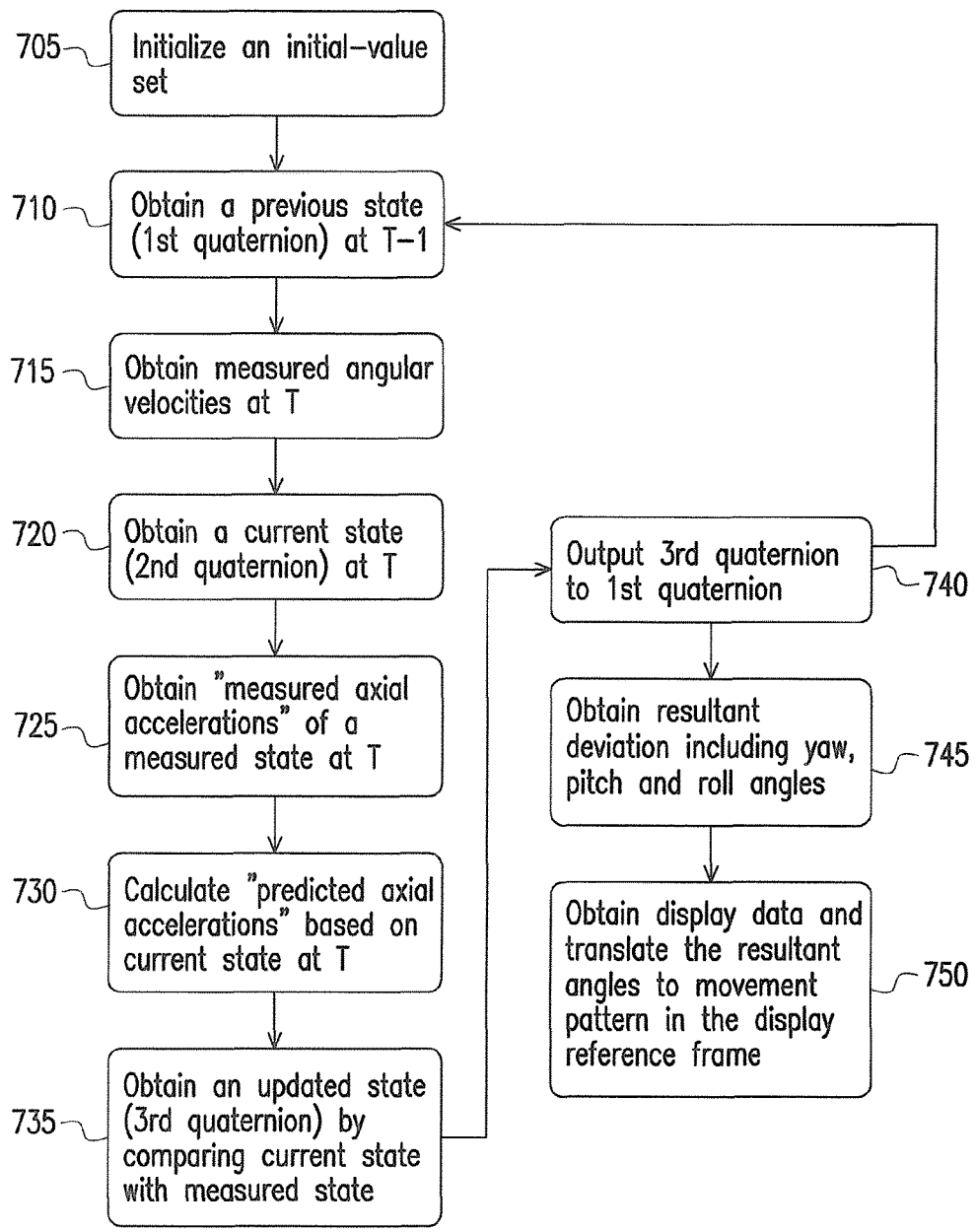
FIG. 8 shows another exemplary flow chart illustrating a method for obtaining resultant deviation including mapping of said deviation to a display of an electronic device according to another embodiment of the present invention.

In addition, it can be understood that the abovementioned comparison utilized by the processing and transmitting module and comprising the update program may too make reference to said different states of the nine-axis motion sensor module as shown in FIGS. 7 and 8. As mentioned previously, the update program may be utilized by the processor to obtain the updated state of the nine-axis motion sensor module based on the previous state associated with a first signal set in relation to the angular velocities $\omega_x$, $\omega_y$, $\omega_z$ and the measured state associated with said second signal set in relation to the axial accelerations Ax, Ay, Az. The abovementioned measured state may include a measurement of said second signal set or measured Ax, Ay, Az and a predicted measurement of Ax', Ay' and Az' obtained based on or calculated from the first signal set. Details of each of the abovementioned states of the nine-axis motion sensor module and the related steps of the method for obtaining the resultant deviation of the electronic device in 3D reference frame are as follows.

Referring to FIG. 7 again, the method for obtaining a resultant deviation including resultant angles in a spatial reference frame of electronic device utilizing a nine-axis motion sensor module according to one embodiment of the present invention may begin at the obtaining of a previous state of the nine-axis motion sensor module. In one embodiment, the previous state of the nine-axis motion sensor module may preferably be in a form of a first quaternion, and the first quaternion may be preferably initialized (step 705) at a very beginning of the process or method and as part of the obtaining of the previous state thereof. In other words, according to one embodiment of the present invention, the signals of the nine-axis motion sensor are preferably to be initialized according to a predetermined value set or quaternion including such as zeros and in particular, the signal or value associated with the yaw angle in terms of a quaternion value. The four elements of the first quaternion may be initialized with predetermined initial values. Alternatively, the first quaternion may be initialized or replaced by another signal sets generated by the rotation sensor and the accelerometer at a next time frame such that the method as shown in FIG. 7 is a continuous loop between a previous time frame T−1 and a present time frame T; details on the replacement of the first quaternion at T−1 with the later outputted quaternion at T is to be provided in the later content. It can be understood that one may make reference to Euler Angles for definition on quaternion. Similarly, it can be easily comprehended that the abovementioned previous time T−1 and present time T may too be substitute by a present time T and a next time T+1 respectively and shall too fall within the scope and spirit of the present invention.

In addition, the abovementioned dynamic environments may include undesirable external interferences to the present invention as mentioned previously. For instance, the undesirable external interferences nay refer to or include undesirable axial accelerations caused by undesirable external forces other than a force of gravity and they may too include or refer to include undesirable magnetism caused by undesirable electromagnetic fields. In a preferred embodiment of the present invention, one of the technical effects of the perform of the method as shown in FIG. 7 include that the abovementioned updated state of the nine-axis motion sensor module to said resulting deviation comprising said resultant angles in said spatial reference frame of the electronic device (step 745) may be preferably obtained excluding undesirable interferences in the dynamic environments, such as decoupling of undesirable external forces from the force of gravity to exclude undesirable axial accelerations and exclusion of undesirable external magnetism caused or induced by undesirable electromagnetic fields in the dynamic environments.

The method illustrated in FIG. 7 may be performed in consecutive time frames. According to one embodiment of the present invention, steps 710-745 may be performed in a looped manner by such as a data processing unit of an electronic device of the present invention. In another embodiment, multiple steps may be performed simultaneously, such as the obtaining of signals from the nine-axis motion sensor module may be performed simultaneously instead of one after another. It can therefore be understood that the steps recited herein are for illustrative purposes only and any other sequential orders or simultaneous steps are possible and shall too be considered to be within the scope of the present invention. The first quaternion with respect to the previous time T is obtained as shown in the figure as step 710. When step 710 is performed, the first quaternion initialized in step 705 is obtained. Otherwise, the first quaternion used in the present time T is generated in the previous time T−1. In other words, the step 710 may generally refer to or represented by the abovementioned "previous state" of the nine-axis motion sensor module; according to another embodiment, the previous state may refer to the steps of 705 and 710.

The next may be to obtain the first signal set generated by the rotation sensor, which includes the measured angular velocities $\omega_x$, $\omega_y$ and $\omega_z$ as shown in step 715 according to an exemplary embodiment of the present invention. In step 720, the second quaternion with respect to a present time T is calculated and obtained based on the angular velocities $\omega_x$, $\omega_y$ and $\omega_z$. The step 715 and 720 may generally refer to or may be represented by the abovementioned "current state" of the nine-axis motion sensor module. In one embodiment, the computing processor may use a data conversion utility including such as an algorithm to convert the angular velocities $\omega_x$, $\omega_y$, $\omega_z$ and first quaternion into the second quaternion. This data conversion utility may be a program or instruction represented by the following equation (1).

$$\begin{bmatrix} \dot{q}_0 \\ \dot{q}_1 \\ \dot{q}_2 \\ \dot{q}_3 \end{bmatrix} = \frac{1}{2} \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \begin{bmatrix} q_0 \\ q_1 \\ q_2 \\ q_3 \end{bmatrix} \quad (1)$$

Equation (1) is a differential equation. The quaternion on the left side of the equal sign is the first order derivative with respect to time of the quaternion $(q_0, q_1, q_2, q_3)$ on the right side of the equal sign. The data conversion utility uses the first quaternion as the initial values for the differential equation (1) and calculates the solution of the differential equation (1). The second quaternion may be represented by a solution of the differential equation (1).

As shown in the figure, the "measured state" of the nine-axis motion sensor module according to one embodiment of the present invention may generally refer or may be represented by steps 725 and 730. In step 725, the second signal set generated by the accelerometer may be obtained, which includes measured axial accelerations Ax, Ay and Az;

or Ax, Ay and Az may refer to the measurement of the axial accelerations obtained. In order to obtain said measured state of the nine-axis motion sensor of the present invention, according to one embodiment, predicted axial accelerations Ax', Ay' and Az' may too be calculated and obtained based on the abovementioned current state of the nine-axis motion sensor module or the second quaternion as shown in step 730. In other words, two sets of axial accelerations may be obtained for the measured state of the nine-axis motion sensor module; one may be the measured axial accelerations Ax, Ay, Az in step 725 and the other may be the predicted axial accelerations Ax', Ay', Az' in step 730 calculated based on the abovementioned current state or second quaternion in relation to the measured angular velocities thereof. Furthermore, in one embodiment, the computing processor may use a data conversion utility to convert quaternion into the predicted axial accelerations Ax', Ay' and Az'. This data conversion utility may be a software program represented by the following equations (2), (3) and (4).

$$2(q_1q_3-q_0q_2)=Ax' \quad (2)$$

$$2(q_2q_3+q_0q_1)=Ay' \quad (3)$$

$$q_0^2-q_1^2-q_2^2+q_3^2=Az' \quad (4)$$

The computing processor calculates the solution (Ax', Ay', Az') of the equations (2), (3) and (4).

According to an exemplary embodiment of the method for obtaining a resultant deviation including deviation angles in a spatial reference frame of an electronic device, including such as a 3D pointing device, a portable electronic device, a navigation equipment or a smartphone, utilizing a nine-axis motion sensor module, it may be preferable to compare the current state of the nine-axis motion sensor module with the measured state thereof with respect to the present time frame T by utilizing a comparison model. In other words, in one embodiment as shown in step 735, it is preferable to compare the second quaternion in relation to the measured angular velocities of the current state at present time T with the measured axial accelerations Ax, Ay, Az as well as the predicted axial accelerations Ax', Ay', Az' also at present time T. Following which, a result may be advantageously obtained as an updated state of the nine-axis motion sensor module, excluding the abovementioned undesirable external interferences of the dynamic environments. In an explanatory example, the updated state may generally refer to the update of the current state of the nine-axis motion sensor module at preset time T. Instructions including equations related to the abovementioned current state, measured state and updated state may be illustrated in the following.

According to an exemplary embodiment of the comparison model utilized by the present invention in relation to step 735 as shown in the figure, the current state correlated to the abovementioned second quaternion and in relation to the angular velocities of gyroscope(s) may be obtained based on an exemplary equation of:

$$x(t|t-1)=f(x_{t-1},u_t) \quad (5)$$

Preferably, a first probability (state transition probability) associated with the said current state may be further obtained based on an exemplary equation of:

$$P(x_t \mid x_{t-1}, u_t) = F_x P(x_{t-1} \mid x_{t-1}) F_x^T + F_u P(u_{t-1} \mid u_{t-1}) F_u^T + Q_t \quad (6)$$

$$F_x = \frac{\partial f(x_{t-1}, u_t)}{\partial x_{t-1}}$$

$$F_x = \frac{\partial f(x_{t-1}, u_t)}{\partial u} \quad (7)$$

wherein $Q_t$=addtional motion model noise

Likewise, the measured state correlated to the abovementioned predicted axial accelerations and in relation to the axial accelerations of accelerometers and current state may be obtained based on an exemplary equation of:

$$z_t(t|t-1)=h(x(t|t-1)) \quad (8)$$

Preferably, a second probability (measurement probability) associated with the measured state may be further obtained based on an exemplary equation of:

$$P(z_t \mid x_t) = H_x P(x_t \mid x_{t-1}) H_x^T + R_t \quad (9)$$

$$H_x = \frac{\partial h(x(t \mid t-1))}{\partial x(t \mid t-1)} \quad (10)$$

wherein $R_t$=measurement model noise

As an illustrative example, the abovementioned first and second probabilities may be further utilized to obtain the updated state of the nine-axis motion sensor module based on an exemplary method of data association of an exemplary equation of:

$$D_t=\{[z_t-h(x(t|t-1))]P(z_t|x_t)[z_t-h(x(t|t-1))]^{-1}\}^{1/2} \quad (11)$$

In one embodiment, the result of the updated state of the nine-axis motion sensor module, preferably involving comparison or data association represented by the equations, may be a third quaternion as shown in the figure. Furthermore, the result may then be further outputted and utilized to obtain a resultant deviation, excluding undesirable interferences of the dynamic environments under which the present invention is subject to, but including deviation angles in a spatial reference frame in the following steps as shown in the figure. In a preferred embodiment of the present invention, said undesirable external interferences may further comprise or refer to undesirable axial accelerations caused by undesirable external forces other than a force of gravity; in another preferred embodiment, said undesirable external interferences may further comprise or refer to undesirable magnetism caused by undesirable electromagnetic fields. In other words, the method and algorithm provided by the present invention may preferably generate or provide an output of the resultant deviation of the nine-axis motion sensor module excluding the abovementioned undesirable interferences. In one example, external forces exerted to cause axial accelerations of a nine-axis motion sensor of an electronic device of the present invention may be decoupled or separated from a force of gravity; and in another example, the undesirable magnetism caused by such as electromagnetic fields external or internal to an electronic device the present invention may be excluded. It can be understood that the examples of current state, measured state, state update, data association and probabilities of the comparison model and method of the present invention recited herein are provided for illustrative purposes only.

As mentioned previously, it may be preferable to output the result of the updated state, preferably in a form of third quaternion, to the previous state of the nine-axis motion sensor module as shown in step 740 in FIG. 7. In a preferred embodiment, the updated state may further comprise a first data association model; and wherein the abovementioned and related data association model may be provided for comparing the measured state associated with said second signal set with a predicted measurement obtained from said current state. In other words, in one embodiment, the first quaternion may be replaced by the abovementioned third quaternion or substitute directly any previous values of first quaternion in the previous time T for further process in a loop. In other words, the third quaternion with respect to the present time T becomes the first quaternion with respect to the next time such as T+1; or, the third quaternion at previous time frame T−1 outputted may now be the first quaternion at present time frame T.

In step 745, the updated state of the nine-axis motion sensor module of the present invention may be further calculated and converted to the resultant deviation including deviation angles associated with the spatial reference frame, wherein the deviation angles includes the yaw angle, pitch angle and roll angle of the electronic device associated with the spatial reference frame, preferably about each of three orthogonal coordinate axes of the spatial reference frame; and whereby the resultant deviation comprising deviation angles associated with the updated state of the nine-axis motion module may be preferably obtained excluding said undesirable external interferences in the dynamic environments. In an explanatory example, said undesirable external interferences may refer to or further comprise undesirable axial accelerations caused by undesirable external forces other than a force of gravity. In another explanatory example, said undesirable external interferences may refer to or further comprise undesirable magnetism caused by undesirable electromagnetic fields. In one embodiment, the computing processor may use a data conversion utility to convert the third quaternion of the updated state of the nine-axis motion sensor module into the yaw, pitch and roll angles thereof. This data conversion utility may be a program or instruction represented by the following equations (12), (13) and (14).

$$yaw = \arctan\left(\frac{2(q_0 q_3 + q_1 q_2)}{q_0^2 + q_1^2 - q_2^2 - q_3^2}\right) \quad (12)$$

$$pitch = \arcsin(2(q_0 q_2 - q_3 q_1)) \quad (13)$$

$$roll = \arctan\left(\frac{2(q_0 q_1 + q_2 q_3)}{q_0^2 - q_1^2 - q_2^2 + q_3^2}\right) \quad (14)$$

The variables $q_0$, $q_1$, $q_2$ and $q_3$ in equations (12), (13) and (14) are the four elements of the third quaternion.

For a looped method continuous with respect to time, in one embodiment of the present invention, the method utilized by for example the computing processor communicated with the nine-axis motion sensor module may return to step 710 to perform the comparison process or method with respect to the next time T+1. In addition, the abovementioned resultant deviation including deviation angles comprising yaw, pitch and roll angles in the spatial reference frame converted from the third quaternion is preferably obtained and outputted in an absolute manner reflecting or associating with the actual movements and rotations of the electronic device of the present invention in said spatial reference frame. It can be understood that said actual movements and rotations of the electronic device of the present invention in the spatial reference frame or 3D reference frame may refer to real-time movements and rotations associated with vectors having both magnitudes and directions along or about orthogonal axes in the spatial reference frame under the dynamic environments.

Figure 9:
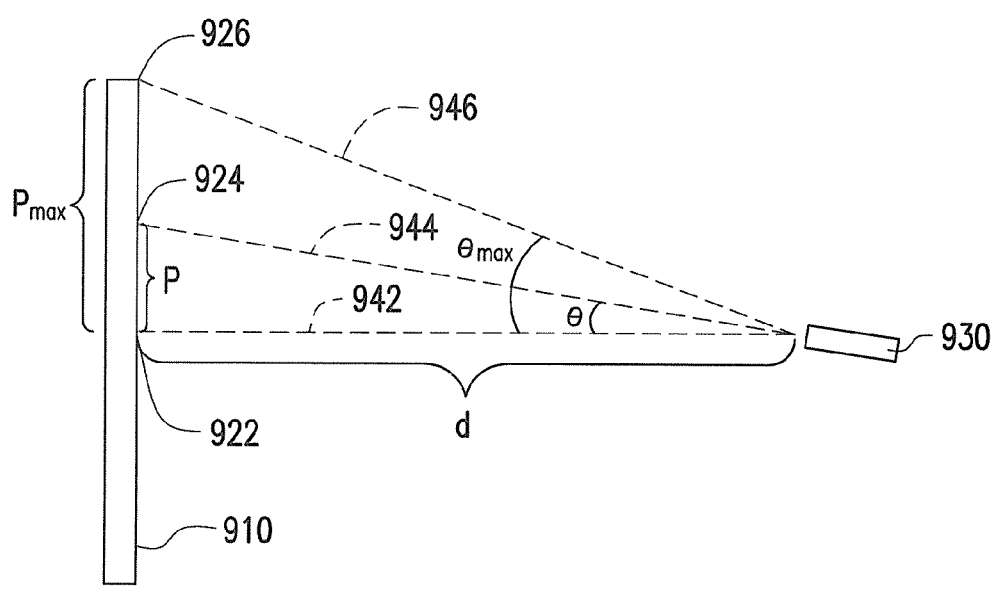
FIG. 9 is a schematic diagram showing the mapping of the resultant angles of the resultant deviation according to an embodiment of the present invention.

FIG. 8 shows a flow chart illustrating a method of mapping resultant deviation angles of an electronic device having movements and rotations in a 3D spatial reference frame and in a dynamic environment onto a display reference frame according to another embodiment of the present invention. FIG. 9 is a schematic diagram showing the aforementioned mapping of the resultant angles of the resultant deviation of an electronic device according to this embodiment. For illustrative purposes, the difference between FIG. 7 and FIG. 8 may be represented by the additional mapping step 750 as shown in FIG. 8. Steps 705-745 in FIG. 8 are the same as their counterparts in FIG. 7, which perform the comparison process for the 3D pointing device. Step 750 performs the mapping process for the electronic device. The computing processor may include a mapping program that performs the mapping step 750. At step 750, the processing and transmitting module may obtain display data including for example, display screen size such as boundary information, and translates the deviation angles of the resultant deviation associated with the spatial reference frame, preferably about each of three orthogonal coordinate axes of the spatial reference frame, to a movement pattern in a mapping area in a display reference frame based on a sensitivity input correlated to the display reference frame. It can be understood that the abovementioned display data may too include or refer to the type of display such as LED, LCD, touch panel or 3D display as well as frequency rate of display such as 120 Hz or 240 Hz. In one embodiment, the display reference frame associated with the display to be mapped may be a 2D display reference frame; in another embodiment, the display reference frame may be a 3D display reference frame of a 3D display.

The aforementioned display data may further include a sensitivity input. The aforementioned sensitivity input is a parameter which may be inputted and adjusted by a user through control buttons attached on the housing of the electronic device. The sensitivity input may represent the sensitivity of the display device with respect to the movement of the electronic device. For details of the mapping process, please refer to FIG. 9. In one embodiment, the sensitivity input is a parameter representing the relationship between the display to be mapped with deviation to a movement pattern in 2D display reference frame and the electronic device of the present invention outputted with said deviation including yaw, pitch and roll angles in 3D reference frame; wherein the relationship may be a distance relationship. In another embodiment, the sensitivity input may be a display screen size including boundary information predetermined by a user; wherein the boundary information may be obtained based on a user input or manual input data from the user. In still another embodiment, the sensitivity input may be predefined or preset in the mapping program such that the parameter of the sensitivity input is a preset value for either increase or decrease the movement patterns including distance or number of pixels to be moved or mapped from said resultant deviation of the electronic device of the present invention.

FIG. 9 is a bird's-eye view of an electronic device 930 according to one embodiment of the present invention directed to a display screen 910 of a display device. The display screen has a central point 922, a target point 924 and a boundary point 926. The central point 922 is the geometric center of the display screen 910. The target point 924 is the position that the electronic device 930 is aiming at. The boundary point 926 is a point on the right boundary of the display screen 910. The points 922, 924, 926 and the electronic device 930 are on a common plane parallel to both the $X_D$ axis and the $Z_D$ axis of the display reference frame $X_D Y_D Z_D$. Virtual beams 942, 944 and 946 are imaginary light beams from the electronic device 930 to the central point 922, the target point 924 and the boundary point 926, respectively. The distance P is the distance between the central point 922 and the target point 924, while the distance $P_{max}$ is the distance between the central point 922 and the boundary point 926. The distance d is the distance between the central point 922 and the electronic device 930. The aforementioned yaw angle of the resultant deviation of the electronic device 930 of the present invention is the angle θ between the virtual beams 942 and 944, while the angle $\theta_{max}$ is the angle between the virtual beams 942 and 946. The aforementioned mapping area is a plane including the display surface of the display screen 910 in the display reference frame. The display surface of the display screen 910 is a subset of the mapping area.

In this embodiment, the aforementioned sensitivity input is provided by the user of the electronic device 930. The sensitivity β is defined by the following equation (15).

$$\beta = \frac{P_{max}}{\theta_{max}} \tag{15}$$

The variable β in equation (16) is the sensitivity input defined by user.

The following equation (16) may be derived from equation (15) and geometry.

$$d = \frac{P_{max}}{\tan\left(\frac{P_{max}}{\beta}\right)} \tag{16}$$

The following equation (17) may be derived from equations (16).

$$P = f(\theta) = d \times \tan\theta = \frac{P_{max} \times \tan\theta}{\tan\left(\frac{P_{max}}{\beta}\right)} \tag{17}$$

In equation (17), the distance $P_{max}$ may be obtained from the width of the display screen of the display data obtained at step 750; the angle θ is the yaw angle obtained at step 745; the sensitivity input β is provided by the user. Therefore, the computing processor of the electronic device 930 can calculate the distance P according to equation (17). Next, the computing processor can easily obtain the horizontal coordinate of the target point 924 on the display screen 910 according to the distance P and the width of the display screen 910. In addition, the computing processor can easily obtains the vertical coordinate of the target point 924 on the display screen 910 according to the pitch angle in a similar way.

The mapping process performed at step 750 may be exemplified by the process of translating the yaw angle and the pitch angle of the resultant angles to the 2D coordinates of the target point 924 on the display screen 910 discussed above. Now the computing processor has the coordinates of the target point 924 of the present time frame. The computing processor subtracts the coordinates of the target point 924 of the previous time frame from the coordinates of the target point 924 of the present time frame. The result of the subtraction is the horizontal offset and the vertical offset of the target point 924 in the present time frame. The horizontal and vertical offsets may be transmitted to the display device so that the display device can track the position of the target point 924. The display device may display a cursor or some video effect on the display screen 910 to highlight the position of the target point 924. The cursor or video effect may exhibit a movement pattern on the display screen 910 when the user moves the electronic device 930 of the present invention.

Likewise, according to another embodiment of the present invention, the comparison method of the present invention may be a lopped method. For a looped method continuous with respect to time, in one embodiment, the method utilized by for example the computing processor communicating with the nine-axis motion sensor module may return to step 710 to perform the comparison process or method with respect to the next time T+1, following which the comparison and mapping process with respect to the next time frame may then be performed.

Figure 10:
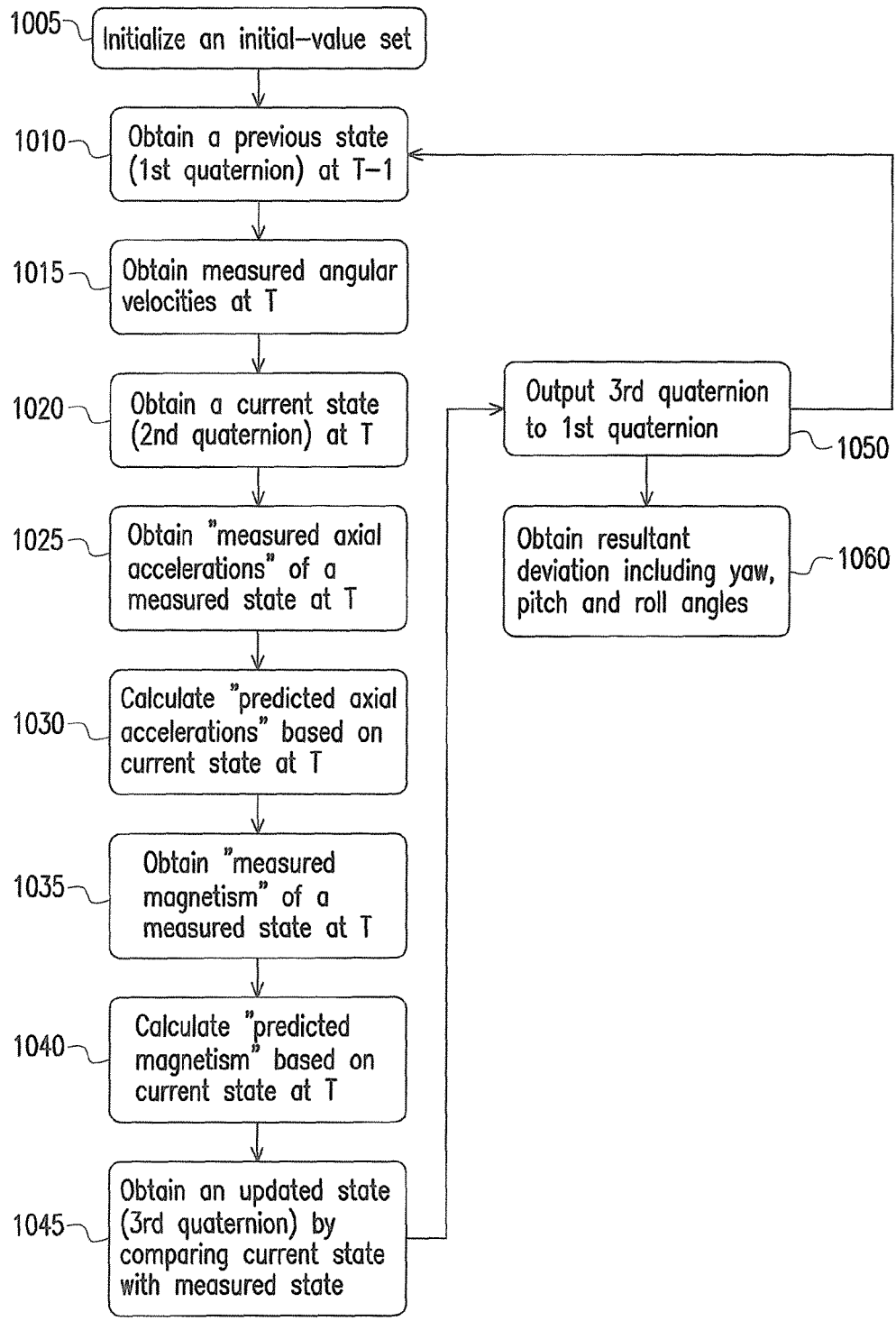
FIG. 10 is an exemplary flow chart illustrating another embodiment of a method for obtaining a resultant deviation of an electronic device of the present invention.

FIG. 10 shows another embodiment of the comparison method of the present invention. The flow chart illustrates a method of obtaining resultant deviation including deviation angles in a spatial reference frame of an electronic device utilizing a nine-axis motion sensor module therein and subject to movements and rotations in dynamic environments in the spatial reference frame and mapping resultant deviation of the electronic device of the present invention having movements and rotations in a 3D spatial reference frame and in a dynamic environment onto a display reference frame according to another embodiment of the present invention; and whereby the resultant deviation comprising deviation angles associated an output or state such as an updated state (details below) of the nine-axis motion module may be preferably obtained excluding said undesirable external interferences in the dynamic environments. In an explanatory example, said undesirable external interferences may refer to or further comprise undesirable axial accelerations caused by undesirable external forces other than a force of gravity. In another explanatory example, said undesirable external interferences may refer to or further comprise undesirable magnetism caused by undesirable electromagnetic fields. The steps 1005-1030 in FIG. 10 may make reference to the ones shown in another embodiment of the present invention as shown in FIG. 7.

For an electronic device, including such as a pointing device, a navigation equipment, a smartphone or other portable electronic apparatus, utilizing a nine-axis motion sensor module, the signals of the magnetometer of the motion sensor module may be preferably be used to facilitate the obtaining of the resultant deviation including deviation angles in 3D reference and preferably in an absolute manner. The third signal set generated by the magnetometer may be obtained as shown in step 1035 in FIG. 10, which includes measured magnetism Mx, My and Mz. In one embodiment, the Mx, My and Mz may refer to the measurement of the magnetism obtained. In order to obtain said measured state of the nine-axis motion sensor, according to one embodiment of the present invention, predicted magnetism Mx', My' and Mz' may too be calculated and obtained based on the abovementioned current state of the nine-axis motion sensor module or the second quaternion as shown in step 1040. In other words, two sets of magnetism may be obtained for the measured state of the nine-axis motion sensor module; one may be the measured magnetism Mx, My, Mz in step 1035 and the other may be the predicted magnetism Mx', My', Mz' in step 1040 calculated based on the abovementioned current state or second quaternion in relation to the measured angular velocities thereof. Furthermore, in one embodiment, the computing processor may use a data conversion utility to convert the current state or second quaternion into predicted magnetism Mx', My' and Mz' and vice versa. This data conversion utility may be a software program represented by the following equations (18), (19) and (20).

$$(q_0^2+q_1^2-q_2^2-q_3^2)\cos \lambda+2(q_1q_3-q_0q_2)\sin \lambda=Mx' \quad (18)$$

$$2(q_1q_2-q_0q_3)\cos \lambda+2(q_2q_3+q_0q_1)\sin \lambda=My' \quad (19)$$

$$2(q_1q_3+q_0q_2)\cos \lambda+(q_0^2-q_1^2-q_2^2+q_3^2)\sin \lambda=Mz' \quad (20)$$

The variable $\lambda$ in equations (18), (19) and (20) is the dip angle between the direction of the ambient magnetic field measured by the magnetometer and a horizontal plane in the spatial reference frame. The dip angle $\lambda$ may be measured or calculated through an initial calibration process of the electronic device of the present invention and then be used as a parameter. The computing processor calculates the solution (Mx',My',Mz') of the equations (18), (19) and (20).

According to an exemplary embodiment of the method for obtaining a resultant deviation including deviation angles in a spatial reference frame of an electronic device, including such as a pointing device, a navigation equipment, a smartphone or other portable electronic apparatus, utilizing a nine-axis motion sensor module, it may be preferable to compare the current state of the nine-axis motion sensor module with the measured state thereof with respect to the present time frame T by utilizing a comparison model. In other words, in one embodiment as shown in step 1045, it is preferable to compare the second quaternion in relation to the measured angular velocities of the current state at present time T with the measured axial accelerations Ax, Ay, Az, the predicted axial accelerations Ax', Ay', Az', the measured magnetism Mx, My, Mz, and the predicted magnetism Mx', My', Mz' also at present time T. Following which, a result may be obtained as an updated state of the nine-axis motion sensor module. In general and in an explanatory example of the present invention, the updated state may generally refer to the update of the previous state of the nine-axis motion sensor module at a previous time T−1 with reference to the current state and/or measured state thereof. The comparison model in step 1045 utilizes the measured axial accelerations Ax, Ay, Az and measured magnetism Mx, My, Mz, as well as the predicted axial accelerations Ax', Ay', Az' and the predicted magnetism Mx', My', Mz'.

In one embodiment, the result of the updated state of the nine-axis motion sensor module, preferably involving comparison or data association represented by the equations associated to the comparison model, may be a third quaternion as shown in the figure. Furthermore, as shown in steps 1050~1060, the result may then be further outputted and utilized to obtain a resultant deviation including deviation angles in a spatial reference frame in the steps as shown in the figure. It can be understood that the examples of current state, measured state, state update, data association and probabilities of the comparison model and method of the present invention are provided for illustrative purposes only.

Figure 11:
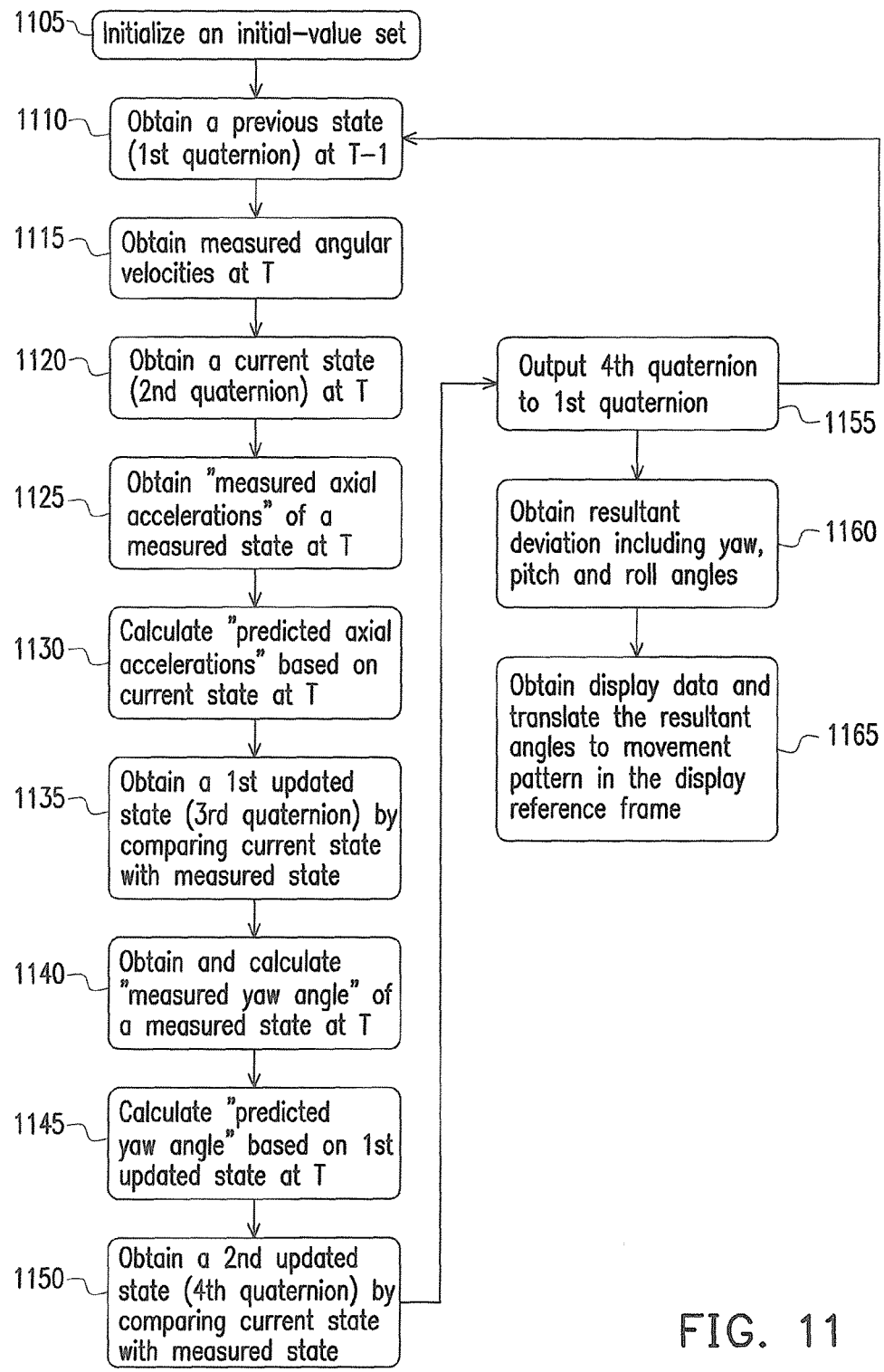
FIG. 11 shows an exemplary flow chart illustrating another embodiment of a method for obtaining a resultant deviation including mapping of such deviation to a display of an electronic device of the present invention.

FIG. 11 shows a further exemplary embodiment of the comparison method of the present invention. The flow chart illustrates a method of obtaining resulting deviation including resultant angles in a spatial reference frame of an electronic device, including such as a pointing device, a navigation equipment, a smartphone or other portable electronic device, utilizing a nine-axis motion sensor module therein and subject to movements and rotations in dynamic environments in the spatial reference frame and mapping resultant deviation angles of said electronic device having movements and rotations in the 3D spatial reference frame and in a dynamic environment onto a display reference frame according to another embodiment of the present invention. Likewise, steps 1105~1130 may include obtaining a previous state and a current state of the motion sensor module as well as a measured state related to the axial accelerations of the motion sensor module. Additionally, in step 1135, it may be preferable to compare the current state of the nine-axis motion sensor module with the measured state thereof with respect to the present time frame T by utilizing a comparison model. In other words, as shown in step 1135, it is preferable to compare the second quaternion in relation to the measured angular velocities of the current state at present time T with the measured axial accelerations Ax, Ay, Az as well as the predicted axial accelerations Ax', Ay', Az' also at present time T. Following which, a result may be obtained as the first updated state of the nine-axis motion sensor module. In an explanatory example, the first updated state may generally refer to the first update of the current state of the nine-axis motion sensor module at preset time T. Furthermore, one of the technical effects of the present invention may too be obtained or achieved. In step 1135, one of the advantages or effects by performing steps from 1105~1135 may be that the first updated state or third quaternion as shown in FIG. 11 may be advantageously obtained excluding undesirable axial accelerations caused by for example undesirable external forces such as the ones decoupled from a force of gravity.

In one embodiment, the result of the first updated state of the nine-axis motion sensor module, preferably involving comparison or data association represented by the equations associated to the comparison model, may be a third quaternion as shown in the figure. In addition, one of the technical effects of the present invention may include the exclusion of undesirable external interferences in the dynamic environment as previously mentioned; and wherein the undesirable external interferences may refer to or further include undesirable axial accelerations caused by undesirable external forces, preferably decoupled from a force of gravity, and/or undesirable magnetism caused by for example undesirable electromagnetic fields either adjacent to the motion sensor module. As shown in step 1140 of FIG. 11, the first updated state of the nine-axis motion sensor module of the present invention may be further calculated and converted to a temporary pitch angle and a temporary roll angle based on the third quaternion. The first updated state, as shown in the figure, may be advantageously obtained such that or whereby undesirable axial accelerations associated with said undesirable external interferences in the dynamic environments may be preferably excluded; in an explanatory example, the first updated state may be preferably obtained excluding the abovementioned undesirable axial accelerations caused by undesirable external forces, such as external forces decoupled from a force of gravity. The third signal set generated by the magnetometer may be obtained, which includes measured magnetism Mx, My and Mz. The measured state of the nine-axis motion sensor module may be obtained by obtaining and calculating a measured yaw angle gained from the motion sensor signals of the nine-axis motion sensor module at the current time T according to the following equation (21).

$$Ty = \frac{-My\cos(Tr) + Mz\sin(Tr)}{Mx\cos(Tp) + My\sin(Tp)\cos(Tr) + Mz\sin(Tp)\cos(Tr)} \quad (21)$$

In equation (21), Ty is the measured yaw angle, Tp is the temporary pitch angle and Tr is the temporary roll angle.

In order to obtain said measured state of the nine-axis motion sensor, according to one embodiment of the present invention, a predicted yaw angle may be calculated and obtained based on the abovementioned first updated state of the nine-axis motion sensor module or the third quaternion at present time T as shown in step 1145. In other words, the measured yaw angle in step 1140 and the predicted yaw angle in step 1145 may be obtained for the measured state of the nine-axis motion sensor module.

Furthermore, it may be preferable to compare the current state of the nine-axis motion sensor module with the measured state thereof with respect to the present time frame T by utilizing a comparison model. In other words, as shown in step 1150, it is preferable to compare the second quaternion in relation to the measured angular velocities of the current state at present time T with the measured axial accelerations Ax, Ay, Az, the predicted axial accelerations Ax', Ay', Az', the measured yaw angle and the predicted yaw angle also at present time T. Following which, a result may be obtained as the second updated state of the nine-axis motion sensor module. In an explanatory example, the second updated state may generally refer to the second update of the current state of the nine-axis motion sensor module at preset time T. The comparison model in step 1150 is very similar to the abovementioned comparison models. Related details are omitted here for brevity. In one embodiment, the result of the second updated state of the nine-axis motion sensor module may be a fourth quaternion as shown in the figure. Furthermore, the result may then be further outputted and utilized to obtain a resulting deviation including resultant angles in a spatial reference frame in the following steps as shown in the figure. In addition to the abovementioned technical effects of the present invention in which undesirable axial accelerations of undesirable external interferences in the dynamic environments may be advantageously excluded as a result of the first updated state of the motion sensor module in step 1135, another technical effect or merit may too be obtained along with result of the second updated state of the motion sensor as shown in step 1150 of FIG. 11. One of the advantages or effects by performing steps such as from 1140~1150 may be that the second updated state or fourth quaternion as shown in FIG. 11 may be advantageously obtained excluding undesirable magnetism such as the ones caused by for example undesirable external or internal electromagnetic fields adjacent to the motion sensor module in the dynamic environments of the present invention.

It may be preferable to output the result of the second updated state, preferably in a form of the fourth quaternion, to the previous state of the nine-axis motion sensor module as shown in step 1155 in the figure. In other words, in one embodiment, the first quaternion may be replaced by the abovementioned fourth quaternion or substitute directly any previous values of first quaternion in the previous time T for further process in a loop. In other words, the fourth quaternion with respect to the present time T becomes the first quaternion with respect to the next time such as T+1; or, the fourth quaternion at previous time frame T−1 outputted may now be the first quaternion at present time frame T.

In step 1160, the second updated state of the nine-axis motion sensor module of the present invention may be further calculated and converted to the resulting deviation including resultant angles associated with the spatial reference frame, wherein the resultant angles includes the yaw angle, pitch angle and roll angle of the 3D pointing device associated with the spatial reference frame, preferably about each of three orthogonal coordinate axes of the spatial reference frame. In addition, the second updated state, as shown in the figure, may be advantageously obtained such that or whereby undesirable magnetism associated with said undesirable external interferences in the dynamic environments may be preferably excluded; in an explanatory example, the second updated state may be preferably obtained excluding the abovementioned undesirable magnetism caused by for example undesirable electromagnetic fields, or magnetism other than the planetary geomagnetism, adjacent or of a magnitude influencing magnetometer of the motion sensor module. The resultant angles may be calculated according to equations (12), (13) and (14), wherein the variables $q_0$, $q_1$, $q_2$ and $q_3$ in equations (12), (13) and (14) are the four elements of the fourth quaternion. Furthermore, the resultant deviation in step 1160 may be advantageously obtained excluding undesirable interferences including such as the ones of undesirable axial accelerations caused by undesirable external forces decoupled from a force of gravity mentioned previously in step 1135 and the ones of undesirable magnetism caused by for example undesirable electromagnetic fields as mentioned previously in step 1150. Likewise, in step 1165 as shown in FIG. 11, the resultant deviation including deviation angles in 3D pointer reference may be further mapped to a display reference such as a 2D display reference of a display.

Figure 12:
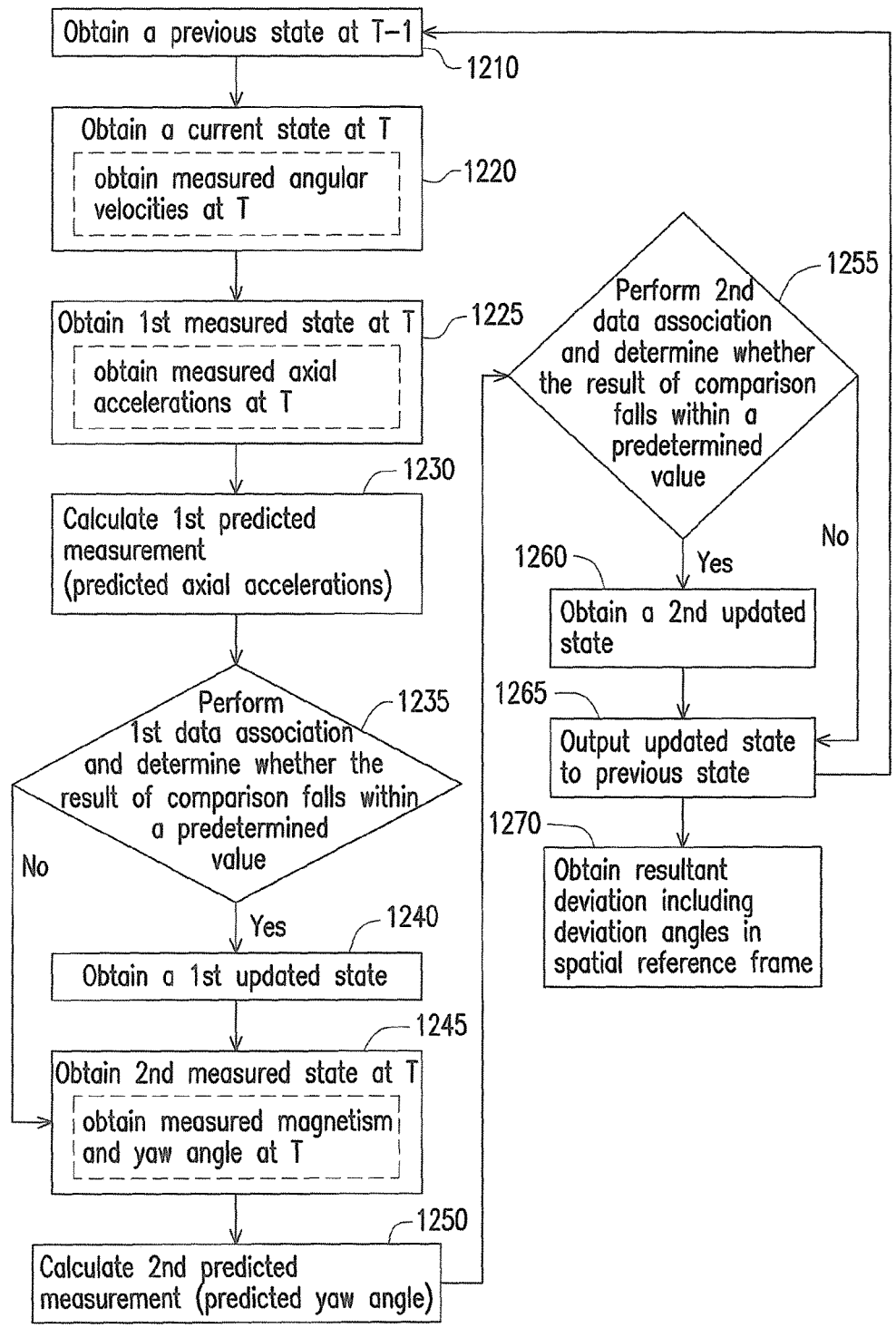
FIG. 12 shows an exemplary flow chart illustrating a method for obtaining resultant deviation of an electronic device according to still another embodiment of the present invention.

As illustrated by FIG. 12, in one preferred embodiment, the first and second updated states may further comprise a first data association model and a second data association model respectively. The first data association model may be advantageously provided for comparing the first measured state associated with said second signal set with a first predicted measurement obtained from said current state; in addition, the second data association model may too be advantageously provided for comparing the second measured state associated with said third signal set with a second predicted measurement obtained from said first updated state. Furthermore, in another preferred embodiment, the first and second updated states may further comprise a first data association model and a second data association model respectively; and wherein the first data association model may be advantageously provided for comparing the first measured state associated with said second signal set with a first predicted measurement obtained from said current state; and wherein the second data association model may be advantageously provided for comparing the second measured state associated with said third signal set with a second predicted measurement obtained from said current state. Details on the differences of the obtaining of said second predicted measurement based on either the first updated state or the current state of the motion sensor module depending upon a comparison result are further described in FIG. 12, as the routes presented or denoted by "Yes" and "No' shown therein.

FIG. 12 shows an exemplary flow chart of another embodiment of the present invention of a method for obtaining a resultant deviation comprising deviation angles of an electronic device, including such as a pointing device, navigation equipment, a smartphone or other portable electronic apparatus. Accordingly, the method for obtaining a resultant deviation including deviation angles in a spatial reference frame of an electronic device utilizing a nine-axis motion sensor module therein and subject to movements and rotations in dynamic environments in said spatial reference frame includes the following steps. As shown in the figure, at step 1210, a previous state of the nine-axis motion sensor module may be obtained; and wherein the previous state is associated with at least previous angular velocities gained from the motion sensor signals of the nine-axis motion sensor module at a previous time T−1. In another embodiment, the previous state is associated with previous angular velocities, previous axial accelerations and previous magnetism gained from the motion sensor signals of the nine-axis motion sensor module at a previous time T−1. Next, at step 1220, it may be to obtain a current state of the nine-axis motion sensor module by obtaining measured angular velocities $\omega_x$, $\omega_y$, $\omega_z$ gained from the motion sensor signals of the nine-axis motion sensor module at a current time T. At step 1225, it may be to obtain a first measured state of the nine-axis motion sensor module by obtaining measured axial accelerations Ax, Ay, Az gained from the motion sensor signals of the nine-axis motion sensor module at the current time T. Following which and at step 1230 is calculating and obtaining a first predicted measurement of the nine-axis motion sensor module based on said current state thereof. At step 1235, a comparison may be performed to determine whether the signals related to the measured state including such as measured axial accelerations and/or measured magnetism are "good enough" to be used to compensate the current state of the motion sensor module and therefore an updated state thereof can be obtained.

According to the previously mentioned objectives of the present invention, it is preferable to provide an advantageous comparison or compensation method capable of outputting resultant deviation of a motion sensor module of a relatively high accuracy in the presence of external or internal interferences including such as electromagnetic fields generated by other electronic components adjacent to the motion sensor modules or of a magnitude strong enough to distort or affect the normal operations or signals of motion sensor module. Under such circumstances, a comparison utilizing data association may be advantageously provided or used to compare measured state of the motion sensor modules with an expected or predicted measurement thereof to determine the compensation for updating an updated state of the previous state. In step 1235 as previously mentioned, the data association may also include a predetermined value preset or preselected in accordance with for example the performance of motion sensor module utilized, and such that the comparison result of the measured state and the predicted measurement may make reference to the data association and the predetermined value or range to determine the compensation needed to take place to update the state of the motion sensor module including such as the previous and/or current states thereof.

Accordingly, updated state(s) of the motion sensor module may be obtained based on the result of the data association(s). As shown in the figure, if the result of abovementioned comparison falls within the predetermined result of for example a predetermined value or range of the data association, then in one embodiment of the present invention, in step 1240, a first updated state of the nine-axis motion sensor module may be obtained based on a first comparison between said first predicted measurement and said first measured state of the nine-axis motion sensor module. Otherwise, if the result is not within the predetermined value of range of the data association, then the first updated state may not be performed or obtained. Such method of the use of data association and comparison may be particularly useful in the abovementioned scenario of external or internal "interferences" such as the ones caused by undesired electromagnetic fields. In the case where the result falls outside of expected range, or denoted by "No" as shown in FIG. 12, the next step would be to obtain another measured state or the second measured state of the motion sensor module to determine whether another data association may be utilized to obtain the second updated state. It can however be understood that the second updated state may be provided as an additional step to the method of the present invention. One may only perform the abovementioned steps and obtain a result of the first updated state based on the measured state including the measured axial accelerations associated with the motion sensor module; in other words, either performing steps to obtain only the first updated state, steps to obtain only the second updated state, and/or steps to obtain both the first and second updated states as shown in the figure, shall all be considered to be within the scope of the present invention and within the spirit of the present invention. Furthermore and likewise, one of the technical effects of the present invention may too be obtained or achieved. In step 1240, one of the advantages or effects by performing steps from 1210~1240 may be that the first updated state as shown in FIG. 12 may be advantageously obtained excluding undesirable axial accelerations caused by for example undesirable external forces such as the ones decoupled from a force of gravity.

In another embodiment of the present invention or in the case where the abovementioned second updated state is to be obtained, one may further perform steps 1245~1260 as shown in FIG. 12. In step 1245, one may obtain a second measured state of the nine-axis motion sensor module by obtaining a measured yaw angle based on measured magnetism Mx, My, Mz gained from the motion sensor signals of the nine-axis motion sensor module at the current time T. Furthermore, as shown in step 1250, a second predicted measurement of the nine-axis motion sensor module may be calculated and obtained, following which a predicted yaw angle may too be obtained based on said first updated state thereof depending upon the result of the comparison such as the route denoted by "Yes" in FIG. 12. In another embodiment, the predicted yaw angle may be obtained based on said current state of the motion sensor module depending upon the result of the comparison such as a result or route of "No" denoted in FIG. 12. Once the measured state and the predicted measurements are obtained and available, a second comparison may be performed to determine whether compensation may be carried out based on the result of the comparison and the second data association. As shown in step 1255, the second data association including a predetermined value or range may be performed to determine whether the comparison falls within said predetermined value or range. If the result falls within said value or range, then a second updated state may be obtained and compensation may too take place as shown in step 1260 with the denotation of "Yes". Otherwise, if the result is not within the predetermined value, then step 1265 shall be carried out, following the direction shown and denoted by "No" in the figure; and in other words, compensation may utilize the second predicted measurement of the motion sensor module thereof for updating instead of using the second measured state thereof. Likewise, in addition to the abovementioned technical effects of the present invention in which undesirable axial accelerations of undesirable external interferences in the dynamic environments may be advantageously excluded as a result of the first updated state of the motion sensor module in step 1240, another technical effect or merit may too be obtained along with result of the second updated state of the motion sensor as shown in step 1260 of FIG. 12. One of the advantages or effects by performing steps such as from 1245~1260 may be that the second updated state as shown in FIG. 12 may be advantageously obtained excluding undesirable magnetism such as the ones caused by for example undesirable external or internal electromagnetic fields adjacent to the motion sensor module in the dynamic environments of the present invention.

Following the above steps, in one embodiment of the present invention in which said comparison method may be provided in a continuous loop or a looped manner with respect to time, the result of the updated state at present time T may then be outputted to the previous state at previous time T−1 and become another beginning of the loop for the abovementioned steps to carry out again. The terminology of time(s) T, T−1 or T+1 shall be clear and apparent and shall too fall within the scope and spirit of the present invention. For example, in step 1260 as shown in FIG. 12, the second updated state of the nine-axis motion sensor module may be obtained by, or may too include, the updating said first updated state thereof based on a second comparison between said second predicted measurement and said second measured state of the nine-axis motion sensor module; and in step 1265, the result of the second updated state thereof may be further outputted to the previous state in a looped manner with respect to time.

After step 1265, the resultant deviation including the deviation angles in the spatial reference frame, namely the yaw, pitch and roll angles, may be obtained in step 1270 in a similar way as those in steps 745, 1060 and 1160. Furthermore, the resultant deviation in step 1270 may be advantageously obtained excluding undesirable interferences including such as the ones of undesirable axial accelerations caused by undesirable external forces decoupled from a force of gravity mentioned previously in step 1240 and the ones of undesirable magnetism caused by for example undesirable electromagnetic fields as mentioned previously in step 1260.

As mentioned previously, in one embodiment of the present invention, the method for obtaining a resultant deviation of an electronic device utilizing a nine-axis motion sensor module, data associations may be provided to obtain a relatively accurate result under for example the existence of external or internal interferences to the sensor module. Accordingly, the abovementioned step of obtaining the first updated state of the nine-axis motion sensor module may further comprise performing a first data association to determine whether said first comparison between said first predicted measurement and said first measured state thereof falls within a first predetermined value of the nine-axis motion sensor module; and wherein the step of obtaining the second updated state of the nine-axis motion sensor module may too further comprise performing a second data association to determine whether said second comparison between said second predicted measurement and said second measured state thereof falls within a second predetermined value of the nine-axis motion sensor module.

Likewise, in accordance to the abovementioned continuous loop of the method of the present invention with respect to time and in one embodiment, the method for obtaining a resultant deviation of an electronic device utilizing a nine-axis motion sensor module may further comprise outputting said second updated state of the nine-axis motion sensor module to said previous state thereof; and wherein said previous state of the nine-axis motion sensor module may be a first quaternion with respect to said previous time T−1; and wherein said current state of the nine-axis motion sensor module may be a second quaternion with respect to said current time T; and wherein said first and second updated states of the nine-axis motion sensor module may too be a third and a fourth quaternion with respect to said current time T respectively.

In summary, the present invention also provides a nine-axis comparison method that compares the detected signals generated by and converted from the rotation of the electronic device, utilizing a nine-axis motion sensor module, about all of the three axes with the detected signals generated by and converted from the acceleration of the device along all of the three axes. In one embodiment, the nine-axis comparison method may then output the resultant deviation including yaw, pitch and roll angles in a spatial reference frame such as a 3D reference frame of the device. In another embodiment, the nine-axis comparison method may also include the mapping of the resultant deviation including yaw, pitch and roll angles in the spatial reference to a display reference frame such as a 2D display reference frame of a display screen of a display device. The nine-axis comparison method involving the comparison of different states of the motion sensor module and the utilization of data association of the present invention in order to output a resultant deviation having yaw, pitch and roll angles in for example 3D reference frame is novel and cannot be easily achieved by any know arts or their combinations thereof.

In view of the above, it is clear that such obtaining and outputting of deviation including 3D angles in a spatial reference frame in an "absolute" manner of the present invention is too novel, and the fact that the electronic device utilizing a motion sensor module therein having a novel comparison method and program of the present invention to obtain and output such deviation in "absolute" manner cannot be easily achieved by any known arts or their combination thereof. The term "absolute" associated with the resulting deviation including resultant angles such as yaw, pitch and roll in a spatial reference frame or 3D reference frame obtained and outputted by the device of the present invention may refer to the "actual" movements and rotations of the 3D pointer device of the present invention in said spatial reference frame. Moreover, the nine-axis comparison method of the present invention may accurately output said deviation including angles in 3D reference frame as noises associated with the nine-axis motion sensor module subject to movement and rotations in dynamic environments and accumulated over time may be effectively eliminated or compensated. Furthermore, the term "a", "an" or "one" recited herein as well as in the claims hereafter may refer to and include the meaning of "at least one" or "more than one". It can be understood that, as previously mentioned, the term of "dynamic" recited herein may refer to moving or subject to motions in general. It too can be understood that the term "excluding" recited herein to describe the exclusion of undesirable interferences is provided for illustrative purposes and shall not be limited to a certain or specific degree or magnitude of the effect of exclusion; any degree or magnitude associated thereto shall be considered to be within the spirit and scope of the present invention. It may be understood that the present invention may be applied to various scenarios and application fields including such as gaming, computers and navigation. It may too be understood that the scope of the present invention shall be determined by the accompanying claims and shall include variations of applications of the present invention as well as differences in the term definitions used or related to including such as pointing devices, navigation equipment, smartphone and/or electronic devices.

What is claimed is:

1. An electronic device subject to movements and rotations in dynamic environments including undesirable external interferences, comprising:
   a housing associated with said movements and rotations of the electronic device in a spatial reference frame;
   a printed circuit board (PCB) enclosed by the housing;
   a nine-axis motion sensor module, having sensor circuitry, attached to the PCB, comprising a rotation sensor for generating a first signal set comprising measured angular velocities ωx, ωy, ωz associated with said movements and rotations of the electronic device in the spatial reference frame, an accelerometer for generating a second signal set comprising measured axial accelerations Ax, Ay, Az associated with said movements and rotations of the electronic device in the spatial reference frame and a magnetometer for generating a third signal set comprising measured magnetism Mx, My, Mz; and
   a computing processor, having processor circuitry, electrically connecting to the nine-axis motion sensor module for calculating a resultant deviation comprising deviation angles in said spatial reference frame by utilizing a comparison utility to compare said first, second and third signal sets such that the deviation angles of the resultant deviation of the nine-axis motion sensor module of the electronic device are obtained excluding said undesirable external interferences in the dynamic environments,
   wherein the comparison utility utilized by the computing processor further comprises an update program to obtain first updated state of the nine-axis motion sensor module based on a current state and a measured state of the nine-axis motion sensor module;
   wherein said current state is associated with at least the first signal set;
   said measured state includes a measurement of at least said second signal set, and predicted magnetism Mx', My', Mz' are calculated based on the current state in relation to the measured angular velocities ωx, ωy, ωz thereof, said undesirable external interferences further comprise undesirable magnetism caused by undesirable electromagnetic fields;
   wherein the first updated state further comprises a data association model to compare the measured state associated with at least said second signal set with a first predicted measurement calculated and obtained from said current state and associated with at least said second signal set;
   wherein the processor is further configured to:
      calculate a second predicted measurement of the nine-axis motion sensor module and obtaining a predicted yaw angle; and
      obtain a second updated state of the nine-axis motion sensor module by updating the first updated state based on a second comparison between the second predicted measurement and the second measured state of the nine-axis motion sensor module; and
   wherein the computing processor further comprises a mapping utility for translating the deviation angles of the resultant deviation of the nine-axis motion sensor module in the spatial reference frame to a movement pattern in a display reference frame of a display based on a user-adjustable sensitivity input.

2. The electronic device of claim 1, wherein said deviation angles of the resultant deviation includes yaw, pitch and roll angles about each of three orthogonal coordinate axes of the spatial reference frame; and wherein the dynamic environments include a condition in which said movements and rotations of the electronic device in the spatial reference frame are continuously nonlinear with respect to time.

3. The electronic device of claim 1 wherein the measured state is further associated with said third signal set; and wherein the predicted measurement calculated and obtained from said current state is further associated with said third signal set.

4. The electronic device of claim 1, wherein the comparison utility utilized by the computing processor further comprises an update program to obtain the first updated state of the nine-axis motion sensor module based on a current state associated with at least said first signal set of the nine-axis motion sensor module and a first measured state associated with said second signal set, and to further obtain a second updated state of the nine-axis motion sensor module based on said first updated state and a second measured state associated with said third signal set; and wherein said first and second measured states include measurements of said second signal set and said third signal set respectively.

5. The electronic device of claim 4, wherein the first and second updated states further comprise a first data association model and a second data association model respectively; and wherein the first data association model is provided for comparing the first measured state associated with said second signal set with a first predicted measurement obtained from said current state; and wherein the second data association model is provided for comparing the second measured state associated with said third signal set with a second predicted measurement obtained from said first updated state.

6. The electronic device of claim 4, wherein the first and second updated states further comprise a first data association model and a second data association model respectively; and wherein the first data association model is provided for comparing the first measured state associated with said second signal set with a first predicted measurement obtained from said current state; and wherein the second data association model is provided for comparing the second measured state associated with said third signal set with a second predicted measurement obtained from said current state.

7. The electronic device of claim 1, wherein the comparison utility utilized by the computing processor further comprises a data converter for converting quaternion values associated with said first, second and third signal sets of the nine-axis motion module to the deviation angles of the resultant deviation of the nine-axis motion sensor module of the electronic device in the spatial reference frame and vice versa.

8. The electronic device of claim 1, wherein the rotation sensor of the nine-axis motion sensor module further comprises at least one resonating mass such that a movement of said at least one resonating mass along an axis of said spatial reference frame is detected and measured by said rotation sensor using Coriolis acceleration effect to generate said first signal set comprising the measured angular velocities ωx, ωy, ωz in said spatial reference frame.

9. The electronic device of claim 1, wherein said undesirable external interferences further comprise undesirable axial accelerations caused by undesirable external forces other than a force of gravity.

10. A method for obtaining a resultant deviation comprising deviation angles in a spatial preference frame of an electronic device utilizing a nine-axis motion sensor module therein and subject to movements and rotations in dynamic environments including undesirable external interferences in said spatial reference frame, comprising the steps of: obtaining a previous state of the nine-axis motion sensor module at a previous time T−1;
  obtaining a current state of the nine-axis motion sensor module at a current time T;
  obtaining a measured state of the nine-axis motion sensor module at the current time T;
  calculating and obtaining a first predicted measurement of the nine-axis motion sensor module based on said current state;
  obtaining first updated state of the nine-axis motion sensor module based on a comparison between said measured state and the predicted measurement calculated and obtained from said current state of the nine-axis motion sensor module and whereby the resultant deviation comprising deviation angles associated with the updated state of the nine-axis motion module is obtained excluding said undesirable external interferences in the dynamic environments, wherein the step of obtaining the current state of the nine-axis motion sensor module further comprises obtaining measured angular velocities ωx, ωy, ωz gained from the motion sensor signals of the nine-axis motion sensor module at a current time T, the step of obtaining the measured state of the nine-axis motion sensor module further comprises obtaining measured axial accelerations Ax, Ay, Az and measured magnetism Mx, My, Mz gained from the motion sensor signals of the nine-axis motion sensor module at the current time T, and calculating predicted magnetism Mx', My', Mz' based on the current state in relation to the measured angular velocities ωx, ωy, ωz thereof;
  calculating a second predicted measurement of the nine-axis motion sensor module and obtaining a predicted yaw angle; and
  obtaining a second updated state of the nine-axis motion sensor module by updating said first updated state based on a second comparison between said second predicted measurement and said second measured state of the nine-axis motion sensor module and whereby undesirable magnetism associated with said undesirable external interferences in the dynamic environments are excluded;
  wherein obtaining the updated state of the nine-axis motion sensor module further comprises performing a data association to determine whether said comparison between said predicted measurement and said measured state falls within a predetermined value of the nine-axis motion sensor module.

11. The method for obtaining a resultant deviation of an electronic device of claim 10, wherein the previous state includes an initial-value set predetermined to initialize said previous state of the nine-axis motion sensor module at a beginning of said method.

12. The method for obtaining a resultant deviation of an electronic device of claim 10, further comprising calculating and converting the first updated state of the nine-axis motion sensor module to said resultant deviation comprising said deviation angles in said spatial reference frame.

13. The method for obtaining a resultant deviation of an electronic device of claim 10, further comprising outputting the first updated state of the nine-axis motion sensor module to the previous state of the nine-axis motion sensor module such that said method is performed in a looped manner for a next time frame; and wherein said deviation angles of the resultant deviation includes yaw, pitch and roll angles about each of three orthogonal coordinate axes of the spatial reference frame.

14. The method for obtaining a resultant deviation of an electronic device of claim 10, wherein said previous state of the nine-axis motion sensor module is a first quaternion with respect to said previous time T−1; wherein said current state of the nine-axis motion sensor module is a second quaternion with respect to said current time T; and wherein said first updated state of the nine-axis motion sensor module is a third quaternion with respect to said current time T.

15. The method for obtaining a resultant deviation of an electronic device of claim 10, wherein said undesirable external interferences further comprise undesirable axial accelerations caused by undesirable external forces other than a force of gravity.

16. The method for obtaining a resultant deviation of an electronic device of claim 10, wherein said undesirable external interferences further comprise undesirable magnetism caused by undesirable electromagnetic fields.

17. A method for obtaining a resultant deviation including deviation angles in a spatial reference frame of an electronic device utilizing a nine-axis motion sensor module therein and subject to movements and rotations in dynamic environments including undesirable external interferences in said spatial reference frame, comprising the steps of:
  obtaining a previous state of the nine-axis motion sensor module; wherein said previous state is associated with at least previous angular velocities gained from the motion sensor signals of the nine-axis motion sensor module at a previous time T−1;
  obtaining a current state of the nine-axis motion sensor module by obtaining measured angular velocities ωx, ωy, ωz gained from the motion sensor signals of the nine-axis motion sensor module at a current time T;
  obtaining a first measured state of the nine-axis motion sensor module by obtaining measured axial accelerations Ax, Ay, Az gained from the motion sensor signals of the nine-axis motion sensor module at the current time T;
  calculating and obtaining a first predicted measurement of the nine-axis motion sensor module based on said current state;
  obtaining a first updated state of the nine-axis motion sensor module based on a first comparison between said first predicted measurement and said first measured state of the nine-axis motion sensor module and whereby undesirable axial accelerations associated with said undesirable external interferences in the dynamic environments are excluded;
  obtaining a second measured state of the nine-axis motion sensor module by obtaining a measured yaw angle based on measured magnetism Mx, My, Mz gained from the motion sensor signals of the nine-axis motion sensor module at the current time T and calculating predicted magnetism Mx', My', Mz' based on the current state in relation to the measured angular velocities ωx, ωy, ωz thereof;
  calculating a second predicted measurement of the nine-axis motion sensor module and obtaining a predicted yaw angle; and
  obtaining a second updated state of the nine-axis motion sensor module by updating said first updated state based on a second comparison between said second predicted measurement and said second measured state of the nine-axis motion sensor module and whereby undesirable magnetism associated with said undesirable external interferences in the dynamic environments are excluded.

18. The method for obtaining a resultant deviation of an electronic device of claim 17, wherein the step of obtaining the first updated state of the nine-axis motion sensor module further comprises performing a first data association to determine whether said first comparison between said first predicted measurement and said first measured state falls within a first predetermined value of the nine-axis motion sensor module; and wherein the step of obtaining the second updated state of the nine-axis motion sensor module further comprises performing a second data association to determine whether said second comparison between said second predicted measurement and said second measured state falls within a second predetermined value of the nine-axis motion sensor module.

19. The method for obtaining a resultant deviation of an electronic device of claim 17, further comprising outputting said second updated state of the nine-axis motion sensor module to said previous state; and wherein said previous state of the nine-axis motion sensor module is a first quaternion with respect to said previous time T−1; and wherein said current state of the nine-axis motion sensor module is a second quaternion with respect to said current time T; and wherein said first and second updated states of the nine-axis motion sensor module are a third and a fourth quaternion with respect to said current time T respectively.

20. The method for obtaining a resultant deviation of an electronic device of claim 17, wherein said previous state is further associated with previous axial accelerations and previous magnetism gained from the motion sensor signals of the nine-axis motion sensor module at a previous time T−1.

21. The method for obtaining a resultant deviation of an electronic device of claim 17, wherein said predicted yaw angle is obtained based on said first updated state of the nine-axis motion sensor module.

22. The method for obtaining a resultant deviation of an electronic device of claim 17, wherein said predicted yaw angle is obtained based on said current state of the nine-axis motion sensor module.

* * * * *